(12) United States Patent
DeCegama

(10) Patent No.: US 8,503,543 B2
(45) Date of Patent: *Aug. 6, 2013

(54) SYSTEMS AND METHODS FOR COMPRESSION, TRANSMISSION AND DECOMPRESSION OF VIDEO CODECS

(76) Inventor: Angel DeCegama, Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/240,712

(22) Filed: Sep. 22, 2011

(65) Prior Publication Data

US 2012/0121022 A1   May 17, 2012

Related U.S. Application Data

(63) Continuation of application No. 12/806,153, filed on Aug. 6, 2010, now Pat. No. 8,031,782, which is a continuation-in-part of application No. 12/657,100, filed on Jan. 12, 2010, now abandoned, which is a continuation of application No. PCT/US2009/004879, filed on Aug. 26, 2009.

(60) Provisional application No. 61/190,585, filed on Aug. 29, 2008.

(51) Int. Cl.
*H04N 11/02* (2006.01)

(52) U.S. Cl.
USPC .............................. 375/240.29; 375/240.19

(58) Field of Classification Search
None
See application file for complete search history.

(56) References Cited

U.S. PATENT DOCUMENTS

| | | | | |
|---|---|---|---|---|
| 5,917,954 A | * | 6/1999 | Girod et al. | 382/248 |
| 5,977,947 A | * | 11/1999 | Potu | 345/660 |
| 7,277,489 B1 | * | 10/2007 | Andrew | 375/240.19 |
| 7,373,006 B2 | * | 5/2008 | Fukuzawa | 382/240 |
| 7,426,315 B2 | * | 9/2008 | Frishman et al. | 382/268 |
| 7,561,623 B2 | * | 7/2009 | Park et al. | 375/240.29 |
| 7,756,207 B2 | * | 7/2010 | Scholz et al. | 375/240.29 |
| 8,031,782 B2 | * | 10/2011 | DeCegama | 375/240.29 |
| 2009/0041365 A1 | * | 2/2009 | Meany | 382/248 |

FOREIGN PATENT DOCUMENTS

EP   09810374.0   9/2012

* cited by examiner

*Primary Examiner* — Christopher S Kelley
*Assistant Examiner* — Christopher Findley
(74) *Attorney, Agent, or Firm* — D. Benjamin Borson; Borson Law Group, PC

(57) ABSTRACT

Embodiments of this invention include computer-implemented mathematical methods to develop software and/or hardware implementations that use wavelet transforms (WT) to pre-process video frames that can then be compressed using a variety of codecs to produce compressed video frames. Such compressed video frames can then be transmitted, decompressed, post-processed using the post-processing methods disclosed in the invention and displayed in their original size and quality using software and/or hardware implementations of embodiments of the invention, thereby producing real-time high-quality reproduction of video sequences. Embodiments of devices that can implement the methods of this invention include mainframe computers, desktop computers, personal computers, laptop computers, tablet computers, wireless computers, television sets, set top boxes, cellular telephones, and computer readable media.

13 Claims, 26 Drawing Sheets

SYSTEMS AND METHODS FOR COMPRESSION, TRANSMISSION AND DECOMPRESSION OF VIDEO CODECS

CLAIM OF PRIORITY

This application is a Continuation of U.S. application Ser. No. 12/806,153 filed Aug. 6, 2010 (now U.S. Pat. No. 8,031,782 issued Oct. 4, 2011), which is a Continuation-In-Part of United States application Ser. No. 12/657,100, filed Jan. 12, 2010, now abandoned), which is a Continuation under 35 U.S.C. 111 of PCT International Application PCT/US2009/004879 filed Aug. 26, 2009, titled "Systems and Methods for Compression, Transmission and Decompression of Video Codecs," Angel DeCegama, inventor, which claims priority under 35 U.S.C. 119(e) to U.S. Provisional Patent Application No. 61/190,585, filed Aug. 29, 2008, entitled: "Improved Methods for Compression Transmission and Decompression of Video Codecs," Angel DeCegama inventor. The above patent and each of the above applications is herein incorporated fully by reference.

COLOR DRAWINGS

The patent or application file contains at least one drawing executed in color. Copies of this patent or patent application publication with color drawing(s) will be provided by the Office upon request and payment of the necessary fee.

COPYRIGHT NOTICE

This application contains material that is subject to protection under copyright laws of the United States (18 U.S.C.) and other countries.

FIELD OF THE INVENTION

This invention relates to the field of video compression when it is desired to minimize the amount of bytes needed to reproduce the different video frames with a desired visual quality while reducing the corresponding costs of storage and transmission. Particularly, this invention relates to wavelet transformation methods to improve the performance of any video codec to compress and decompress video frames.

BACKGROUND

Video communications systems are being swamped by increasing amounts of data and current video compression techniques have remained almost stagnant in recent years. New techniques are needed to significantly cut the video data storage and transmission requirements.

SUMMARY

Although video compression, transmission, decompression and display technologies have been under rapid development, many of the methods used are applicable to only a few types of video technologies. Thus, a new problem in the field is how to develop compression and decompression methods that are widely applicable to a variety of video codecs so that computer storage and transmission requirements are minimized.

To solve this and other problems, I have discovered and developed new methods for rapid compression, decompression and display that are applicable to a wide range of video codecs that significantly reduce computer storage and transmission requirements which maintaining high-quality video output, so that movies, entertainment, live television, and the like can be viewed in real time.

In some embodiments of this invention, it is possible to reduce data storage and transmission requirements by 50% for a given information content and user quality of service. In other embodiments, reductions of over 70% can be easily achieved, compared to the codec-alone level of compression. Such advantageous effects can be obtained with little or not appreciable loss of visual quality.

These embodiments of this invention solve important problems in video transmission and storage without any disruption of existing video compression codecs and can be applied without the need for special handling of a codec. Certain embodiments of this invention simply enhance the function of existing codecs by making them perform better with computer-based methods to process each frame before being compressed and after being decompressed. It is not a disruptive technology. It is simply an enabling technology. Aspects of this invention are based on the mathematics of the Wavelet Transform (WT).

Embodiments of the invention involve pre-processing a video image, decimating the image using WT, taking the decimated WT of a given video frame down several levels and keeping only the low-frequency part at each level. An example of such a "reduction method" is described herein, below. Then, a video codec operates in its usual fashion on such a "pre-processed frame" or "reduced frame" to compress the image and further decrease the amount of information that is needed to be stored and transmitted. Then, the data representing the pre-processed frame compressed using a codec can be transmitted with high efficiency because the number of bits of information has been reduced substantially compared to either the original frame, or the frame that had been processed by the codec alone.

FIG. 1 depicts a schematic drawing 100a of a method of this invention. Input Video File 10 is received by a computer input device, and is then pre-processed by Size Reduction method 20 of this invention to produce a Reduced Video File 30. Reduced Video File 30 is then processed by Codec 40a, thereby producing Compressed Video File 50. Then, Codec 40b decompresses Compressed Video File 50 to produce Decompressed Video File 60 being ¼, ¹⁄₁₆, ¹⁄₆₄ etc. of the original size of Input Video File 10. Application of a post-processing method of Frame Expansion 70 produces Output Video File 80 having a full size image which is then displayed on video monitor 90 or is stored in a memory device 100. Optionally, Transmission Process 55 can transmit Compressed Video File 50 to a remote location, where it can be decompressed by the codec and post-processed according to methods of this invention, and displayed on a video monitor or stored for future use.

FIG. 2 depicts a general schematic drawing 200 showing how an original frame is reduced using frame pre-processing methods of this invention. Original Frame 210 is first treated to decimate low frequency (LF) components of the WT 220, which are kept. High frequency (HF) components 230 are discarded. Then, 220 is then further pre-processed in step 235, again decimating low frequency (LF) components of the WT 240, which are kept. High frequency (HF) components 250 are discarded. The process can be repeated as desired through 3, 4, 5, 6, or even more levels.

FIG. 3 depicts a general schematic drawing 300 showing frame size expansion according to an embodiment of this invention. Reduced Size 310, is vertically expanded in step 315, thereby producing Vertically Expanded Frame 320, which is then horizontally expanded in step 325 producing Horizontally Expanded Frame 330. Horizontally Expanded Frame 330 is vertically expanded in step 335 thereby producing Vertically Expanded 340, which is horizontally expanded in step 345, thereby producing Horizontally Expanded Frame 350. The process can be repeated as many times as desired through 3, 4, 5, 6 or more levels.

Pre-processing methods of this invention can result in a size reduction for the frame of ¼ for one level of transformation or ¹⁄₁₆ for two levels of transformation, and so on. This can be done for all frames in a given video sequence. Then the reduced frames are used to create a new video file, for example, in .avi format. It can be appreciated that other file formats can also be used, including for example, OG3, Asf, QuickTime, Real Media, Matroska, DIVX and MP4. This file is then input to any available codec of choice and it is compressed by the codec following its standard procedure to a size which typically ranges from 40% (one level of WT) to less than 20% (two levels or more of WT) of the compressed size obtained without the step of frame size reduction. Such files can be stored and/or transmitted with very significant cost savings. By appropriately interfacing with the codec, such procedure can be carried out frame by frame instead of having to create an intermediate file.

For decompression of each frame, the codec is used in its normal way and a file (for example, in .avi format) of a size approximately equal to ¼ (one level of WT) or ¹⁄₁₆, ¹⁄₆₄, etc. (two levels or more of WT) of the original uncompressed file size is obtained. The final step is to generate a file where all the frames are full size with the file size being the same as that of the original uncompressed file. The methods and systems to accomplish that without loss of quality with respect to the decompressed frames produced by the codec without the initial frame size reduction are described herein. This step can be accomplished frame by frame without producing the intermediate file, further improving the efficiency of the process.

It can be appreciated that a series of frames can be pre-processed, compressed, transmitted, decompressed, post-processed and displayed in real time, thereby producing a high quality video, such as a movie or live broadcast. Because the steps in pre-processing, compression, decompression, post-processing can be carried out very rapidly, a reproduced video (e.g., a movie or live broadcast), can be viewed in real time.

Thus, in certain aspects, this invention provides a system for video image compression and decompression, comprising:

a first computer module for image frame pre-processing using direct wavelet transformation (WT);

a video codec;

a second computer module for image frame post-processing using low-frequency parts of the WT and the last pixel of every row and column of the original image before the WT and an output device.

In other aspects, this invention provides a system wherein said first computer module comprises:

an input buffer for storing a video image frame;

a memory device storing instructions for frame pre-processing, wherein said instructions are based upon direct wavelet transformation (WT);

a processor for implementing said instructions for frame pre-processing, and an output.

In further aspects, this invention includes systems wherein said second computer module comprises:

an input buffer;

a memory device storing instructions for frame post-processing, wherein said instructions are based upon using low-frequency parts of the WT plus the last pixel of every row and column of the original image before the WT;

a processor for implementing said instructions for frame post-processing; and an output.

In still further aspects, this invention provides systems further comprising another storage device for storing a post-processed frame of said video image.

In other aspects, a system of this invention includes instructions for frame pre-processing using decimated WT and retaining low frequency part of said decimated WT and discarding high-frequency part of the decimated WT.

In still other aspects, a system of this invention includes instructions for frame post-processing to recreate a post-processed frame by using low-frequency parts of the WT and the last pixel of every row and column of the original image before the WT.

In other aspects a system of this invention includes instructions for frame post-processing to recreate a full sized post-processed frame by using low-frequency parts of the WT and the last pixel of every row and column of the original image before the WT.

In further aspects, this invention provides an integrated computer device for pre-processing a video image frame, comprising:

a computer storage module containing instructions for frame pre-processing according to decimated WT; and a processor for processing said decimated WT by retaining low-frequency parts and discarding high-frequency parts.

In additional aspects, this invention provides an integrated computer device for post-processing a video image frame, comprising:

a computer storage module containing instructions for frame post-processing using low-frequency parts of the WT and the last pixel of every row and column of the original image before the WT; and a processor for processing said computations to re-create a full-size video image.

In still further aspects, this invention provides a computer readable medium, comprising:

a medium; and instructions thereon to pre-process a video frame using WT.

In still additional aspects, this invention provides a computer readable medium, comprising:

a medium; and instructions thereon to post-process a reduced video frame to re-create a video frame of original size using low-frequency parts of the WT plus the last pixel of every row and column of the original image before the WT.

In certain of these above aspects, a computer readable medium is a diskette, compact disk (CD), magnetic tape, paper or punch card.

In aspects of this invention, the Haar WT is used.

In other aspects of this invention Daubechies-4, Daubechies-6, Daubechies-8, biorthogonal or asymmetrical wavelets can be used.

Systems of this invention can provide high-quality reproduction of video images in real time. In some aspects, systems can provide over 50% reduction in storage space. In other aspects, systems can provide over 50% reduction in transmission cost, with little perceptible loss of visual quality. In other aspects, systems of this invention can provide 70% to 80% reduction in storage costs. In additional aspects, systems of this invention can provide 70% to 80% decrease in transmission costs, with little or no perceptible loss of visual quality compared to codec alone compression, transmission and decompression.

In other aspects, this invention provides a method for producing a video image of an object, comprising the steps:

a. providing a digitized image frame of said object;
b. providing a decimated WT of said digitized image frame;
c. discarding high-frequency components of said decimated WT thereby producing a pre-processed frame;
d. compressing said pre-processed frame using a video codec producing a compressed video frame;
e. decompressing said compressed video frame using said codec; and
f. recreating a full sized image of said frame using post-processing using low-frequency parts of the WT and the last pixel of every row and column of the original image before the WT.

In other aspects, a method of this invention provides after step d above, a step of transmitting said compressed image to a remote location.

In still other aspects, this invention provides a method, further comprising displaying said full sized image on a video monitor.

In further aspects, this invention provides a method, wherein said step of pre-processing includes a single level frame size reduction according to the following steps:

```
- For every row in input frame pFrameIn
{
    o    Compute the decimated low-frequency Haar WT for
         consecutive pixels
    o    Store in half the width of pFrameIn the resulting values
    o    At end of row, store the last pixel unchanged
}
- For every 2 consecutive rows in modified pFrameIn
{
    o    Compute the decimated low frequency Haar WT of
         corresponding pixels in the 2 rows column by column
    o    Store the resulting values in output frame pFrameOut
    o    Advance row position by 2
}
```

Store the last row of the modified pFrameIn in pFrameOut last row.

In certain of these aspects, this invention provides a method, further comprising a second level pre-processing step.

In other of these aspects, this invention provides a method, further comprising a second level step and a third level step of pre-processing.

In additional aspects, this invention provides a method, wherein said step of post-processing includes a first level frame size expansion according to the following steps:

```
- Copy last row of input frame pFrameIn into intermediate output frame
  Img with the same pixels per row as pFrameIn and double the number of
  rows.
- For each pixel position of pFrameIn and Img
{
    o   Calculate the new pixel values of 2 rows of Img starting at the
        bottom and moving up column by column according to the
        formulas
        y_{2n} = (2x_n + y_{2n+1})/3 and
        y_{2n-1} = (4x_n - y_{2n+1})/3
        (the x's represent pixels of pFrameIn and the y's represent pixels
        of Img)
```

```
        o   Store the calculated pixels in Img
}
- For every row of Img
{
        o   Start with the last pixel and store it in the last pixel of the
            corresponding row of the output frame pFrameOut
        o   Compute the pixels of the rest of the row from right to left
            according to the above formulas where now the x's represent the
            pixels of Img and the y's represent the pixels of pFrameOut
        o   Store the calculated pixels in pFrameOut
}
```

In certain of these aspects, this invention includes, a method, further comprising the step of a second level frame size expansion.

In other of these aspects, this invention includes a method, further comprising a second level step and a third level step of frame size expansion.

In certain embodiments, this invention includes a method, wherein a codec is selected from the group consisting of MPEG-4, H264, VC-1, and DivX.

In other embodiments, this invention includes a method, wherein said codec is a wavelet-based codec or any other kind of codec.

In certain aspects, methods of this invention can provide high-quality video reproduction of video images in real time. In some aspects, methods can provide over 50% reduction in storage space. In other aspects, methods can provide over 50% reduction in transmission cost, with little perceptible loss of visual quality. In other aspects, the reduction in storage space may be over 70% to 80%, with little reduction in video quality compared to codec-alone compression, transmission and decompression.

There are a multitude of applications for video compression in areas such as security, distant learning, videoconferencing, entertainment and telemedicine.

BRIEF DESCRIPTION OF THE FIGURES

This invention is described with reference to specific embodiments thereof. Other features of this invention can be appreciated in view of the Figure, in which.

DETAILED DESCRIPTION

Figure 1:
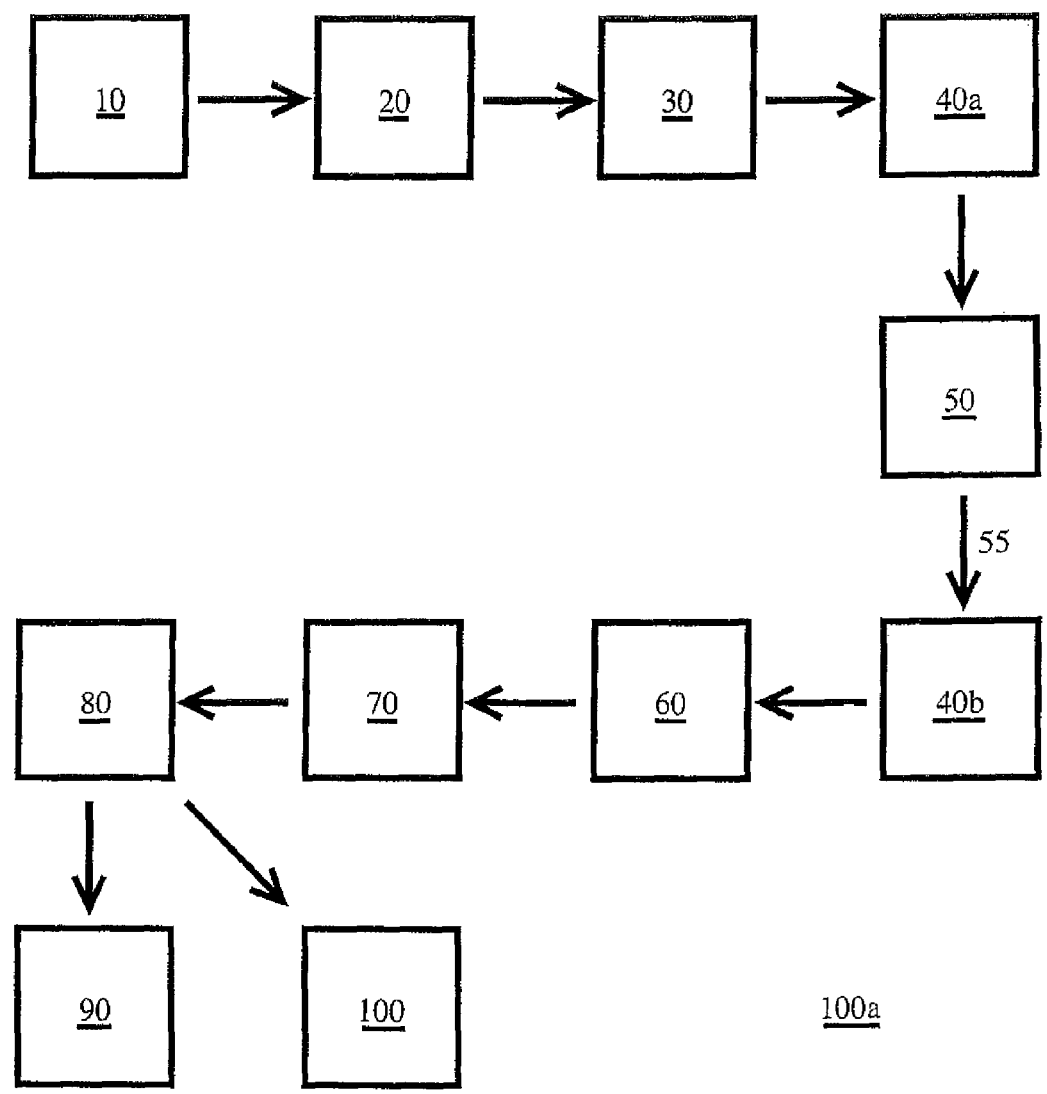
FIG. 1 shows a video compression system using the invention in conjunction with a video codec.
Figure 2:
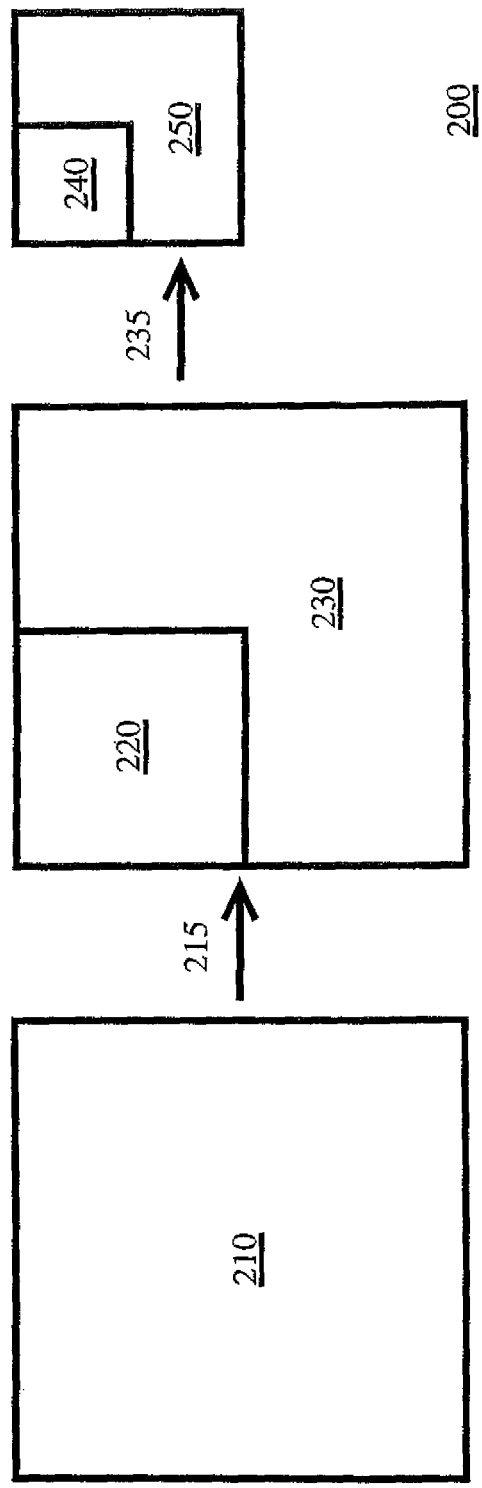
FIG. 2 shows a frame size reduction step of an embodiment of the invention that reduces the length of the columns and rows of an original frame by applying a decimated WT repeatedly level after level of reduction.
Figure 3:
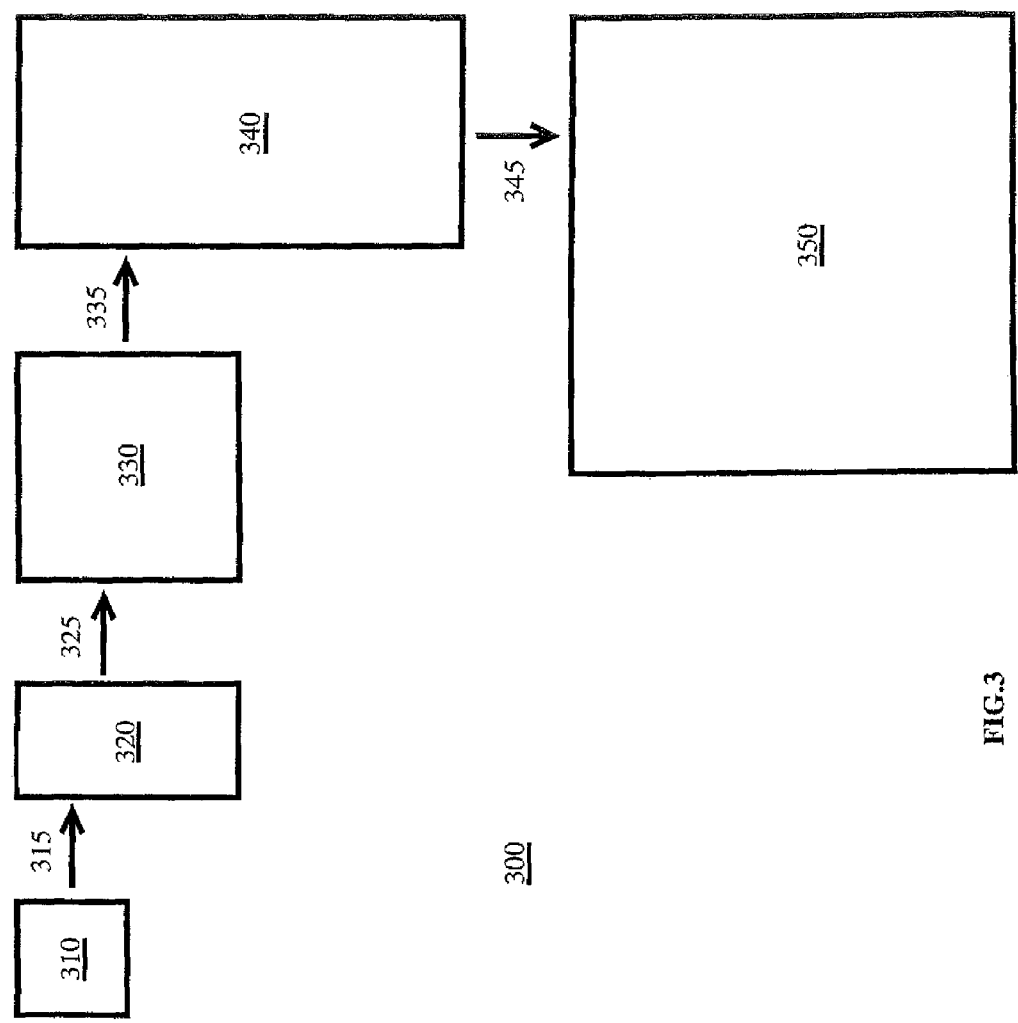
FIG. 3 shows an expansion of an embodiment of the invention of columns and rows to recover their original lengths level after level.

Aspects of this invention are based on the mathematics of the Wavelet Transform (WT). Embodiments of the invention involve taking the decimated WT of a given video frame down several levels and keeping only the low-frequency part at each level. Embodiments of this invention include new systems and methods for decreasing the amount of space needed to store electronic files containing video images.

In certain embodiments, a frame of a video file is pre-processed by methods and systems of this invention to reduce its size by factors of 4, 16, 64 or even further. Then a video codec is applied to compress the frame of significantly reduced size to produce a compressed file which is significantly smaller than the frame would be without the use of the frame pre-processing. In some embodiments, all frames of a video file can be processed in a similar fashion. Such compressed file can then be stored and/or transmitted before decompression. The final step is to recover one or more individual video frames in their original size with comparable quality. This is accomplished by the second part of the invention which is used after a codec decompression step.

As used herein the term "video image" has the same meaning as "video frame," and the term "image" has the same meaning as "frame" when used in the context of video information.

As used herein, the terms "frame pre-processing," "frame size preprocessing" and "frame size reduction" mean processes where a video image or video frame is reduced in accordance with aspects of this invention prior to encoding (compression) by a codec.

As used herein, the terms "frame post-processing," "frame size post-processing" and "frame expansion" mean processes whereby an image decoded by a codec is further expanded according to methods of this invention to produce a high-quality image.

The term "codec" refers to a computerized method for coding and decoding information, and as applied to this invention, refers to a large number of different technologies, including MPEG-4, H-264, VC-1 as well as wavelet-based methods for video compression/decompression disclosed in U.S. Pat. No. 7,317,840, herein incorporated fully by reference.

The term "computer readable medium" or "medium" as applied to a storage device includes diskettes, compact disks (CDs) magnetic tape, paper, flash drive, punch cards or other physical embodiments containing instructions thereon that can be retrieved by a computer device and implemented using a special purpose computer programmed to operate according to methods of this invention. A "non-physical medium" includes signals which can be received by a computer system and stored and implemented by a computer processor.

Embodiments of the present invention are described with reference to flowchart illustrations or pseudocode. These methods and systems can also be implemented as computer program products. In this regard, each block or step of a flowchart, pseudocode or computer code, and combinations of blocks (and/or steps) in a flowchart, pseudocode or computer code can be implemented by various means, such as hardware, firmware, and/or software including one or more computer program instructions embodied in computer-readable program code logic. As will be appreciated, any such computer program instructions may be loaded onto a computer, including a general purpose computer or a special purpose computer, or other programmable processing apparatus to produce a machine, such that the computer program instructions which execute on the computer or other programmable processing apparatus implement the functions specified in the block(s) of the flowchart(s), pseudocode or computer code.

Accordingly, blocks of the flowcharts, pseudocode or computer code support combinations of methods for performing the specified functions, combinations of steps for performing the specified functions, and computer program instructions, such as embodied in computer-readable program code logic for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instructions which implement the function specified in the block(s) of the flowchart(s), pseudocode or computer code. The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

EMBODIMENTS OF THE INVENTION

In embodiments of this invention, a feature is the ability to recreate a given image or video frame from the low-frequency component of its WT which can be ¼, ¹⁄₁₆, ¹⁄₆₄ etc. the size of the original image or video frame. This can be done precisely by applying the mathematics of direct wavelet transformation (WT) and the computations described below.

Take, for example, the Haar wavelet. The direct Haar WT low-frequency coefficients are $a_2=0.5$ and $a_1=0.5$ and the high-frequency coefficients are $b_2=+0.5$ and $b_1=-0.5$. The IWT low-frequency coefficients are $aa_2=1.0$ and $aa_1=1.0$ and the IWT high-frequency coefficients are $bb_2=-1.0$ and $bb_1=+1.0$. The WT is applied to the individual pixel rows and columns of a given image or video frame. This is done separately for the luminance (Y) and chrominance (U, V) components of the different pixels of each row and column. It can also be done for the R, G and B planes.

Let's define a set of $y_i$s to constitute the different values of one such component of a given row or column of an image or video frame. Let's also define a set of $x_i$s to be the corresponding WT low-frequency values and a set pf $z_i$s to be the corresponding WT high-frequency values.

We can then write for the Haar WT (with decimation and no wraparound):

$$X_0 = a_2 y_0 + a_1 y_1 \quad Z_0 = b_2 y_0 + b_1 y_1$$

$$X_1 = a_2 y_2 + a_1 y_3 \quad Z_1 = b_2 y_2 + b_1 y_3$$

$$X_n = a_2 y_{2n} + a_1 y_{2n+1} \quad Z_n = b_2 y_{2n} + b_1 y_{2n+1}$$

Figure 26:
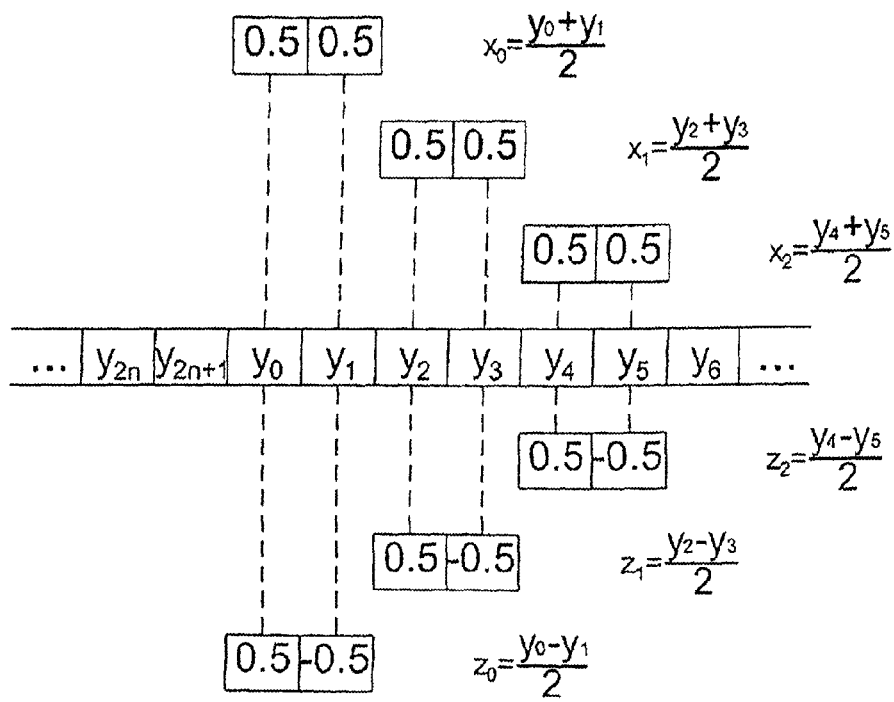
FIG. 26 is a graphical depiction of a method for calculating wavelet transform (WT) low frequency (LF) and high frequency (HF) values process using Haar wavelets.

The procedure for these calculations is shown in FIG. 26. Knowing both the $x_i$s and the $z_i$s we can reconstruct exactly the $y_i$s by calculating the corresponding IWT.

$$y_0 = aa_2 x_0 + bb_2 z_0 = x_0 - z_0$$

$$y_1 = aa_1 x_1 + bb_1 z_1 = x_1 + z_1$$

$$y_2 = aa_2 x_1 + bb_2 z_1 = x_1 - z_1$$

$$y_3 = aa_1 x_2 + bb_1 z_2 = x_2 + z_2$$

$$\ldots$$

$$y_{2n-1} = x_n + z_n$$

$$y_{2n} = aa_2 x_n + bb_2 z_n = x_n - z_n.$$

$y_{2n+1}$ is given and need not be calculated.

Figure 25:
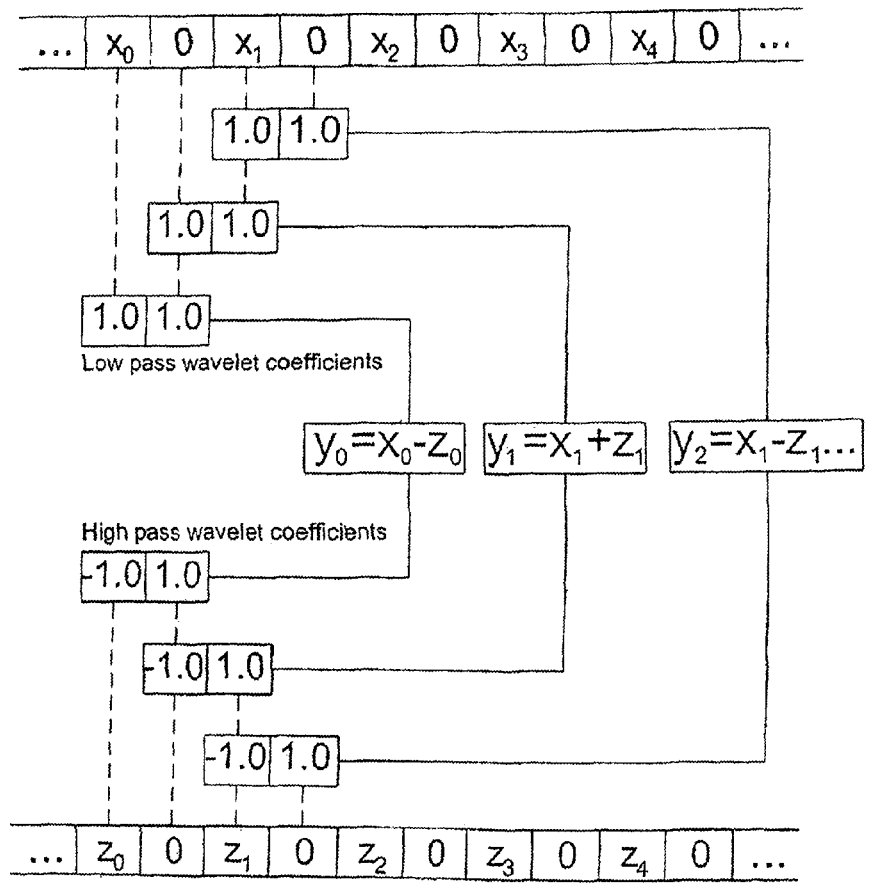
FIG. 25 is a graphical depiction of a method for calculating the inverse wavelet transform (IWT) using Haar wavelets.

The above equations represent the IWT process shown in FIG. 25. Assuming that $y_{2n+1}$ is known, we can then write:

$$y_{2n} = x_n - b_2 y_{2n} - b_1 y_{2n+1} = x_n - 0.5 y_{2n} + 0.5 y_{2n+1}$$

and $$y_{2n} = \frac{x_n}{1.5} + \frac{0.5 * y_{2n+1}}{1.5} = \frac{2x_n + y_{2n+1}}{3}$$

Similarly, we can keep moving back towards $y_0$.

$$y_{2n-1} = x_n + z_n$$
$$= x_n + b_2 y_{2n} + b_1 y_{2n+1}$$
$$= x_n + 0.5 y_{2n} - 0.5 y_{2n+1}$$
$$= \frac{4x_n - y_{2n+1}}{3}$$

$$\vdots$$

$$y_2 = \frac{2x_1 + y_3}{3}$$

$$y_1 = \frac{4x_1 - y_3}{3}$$

$$y_0 = \frac{2x_0 + y_1}{3}$$

Similar equations can be obtained by moving from top to bottom and from left to right.

In this case, $y_0$ is known and we can calculate the remaining pixels ($y_i$s) of any row and column, i.e., $$y_0 = x_0 - z_0 = x_0 - \frac{y_0 - y_1}{2} \text{ that gives } y_1 = 3y_0 - 2x_0$$

$$y_1 = x_1 + z_1$$

$$y_2 = x_1 + z_1 \text{ that gives: } y_2 = 2x_1 - y_1 \text{ and}$$

$$y_3 = 2y_2 - 2x_1.$$

$$y_3 = x_2 + z_2$$

$$y_4 = x_2 - z_2 \text{ that gives: } y_4 = 2x_2 - y_3 \text{ and}$$

$$y_5 = 3y_4 - 2x_2$$

$$\vdots$$

-continued $$y_{2n-1} = x_n + z_n$$

$$y_{2n} = x_n - z_n \text{ that gives: } y_{2n} = 2x_n - y_{2n-1} \text{ and}$$

$$y_{2n+1} = 3y_{2n} - 2x_n.$$

Another possibility is to start at any given pixel of a row or column and move backward or forward computing the remaining pixels using the above two sets of equations. The advantage of doing this is that this approach may be considered a form of encryption. If the starting point pixel is not known for every row and column, using the wrong starting pixels will probably result in unrecognizable frames. The actual starting pixel can be generated randomly using a pseudo-random number generator with a specific random seed value. All the receiver of the video compressed with the techniques of the invention needs to do is to use such random seed value at the decompression end. Such value is like an encryption key for legitimate users. It can be easily entered into the decompression algorithm for high quality video reconstruction.

Note that the $x_i$ values are approximate because the actual original values have been processed by the codec being used to compress/decompress. Therefore, the $y_i$s calculated with the preceding algorithm are also approximations. The question is how good the approximations are. This can be determined by the perceived visual quality of the output video and by calculating the PSNR values for every output video frame for different bit rates and comparing such values for the codec alone and for the values obtained using methods of this invention.

In terms of the PSNR values, the following Table 1 shows the comparison in PSNR values (in decibels (db)) between the codec alone and the codec with the invention for different video examples.

TABLE 1

PSNR Values (in db)

| HD Videos (1920 × 1080) | Casino Royale | Baseball | King Kong | Terminator | Yellowstone |
|---|---|---|---|---|---|
| H264 - 3 Mbps | 127.05 | 125.32 | 126.91 | 126.82 | 110.66 |
| ADC2 - 3 Mbps | 128.14 | 128.677394 | 128.132767 | 128.118862 | 114.999 |
| H264 - 2 Mbps | 102.69 | 107.22 | 105.49 | 106.18 | 108.76 |
| ADC2 - 2 Mbps | 128.1179233 | 128.6735 | 128.127 | 128.1181 | 114.987 |
| H264 - 1 Mbps | 81.29 | 86.13 | 81.23 | 82.15 | 76.82 |
| ADC2 - 1 Mbps | 128.117233 | 128.6731 | 128.121 | 128.11879 | 114.966 |
| H264 - 0.5 Mbps | 69.19 | 72.67 | 70.83 | 72.21 | 65.31 |
| ADC2 - 0.5 Mbps | 128.117224 | 128.6728 | 128.119 | 128.11876 | 114.953 |
| H264 - 0.25 Mbps | 54.33 | 57.92 | 56.11 | 56.62 | 48.12 |
| ADC2 - 0.25 Mbps | 128.117223 | 128.6724 | 128.117432 | 128.118744 | 114.952515 |

Table 1 clearly shows the high quality of the video reconstructed by the invention even at very high levels of compression, whereas the quality of the video decompressed by any standard codec (H264 in this example) quickly decays with lower bit-rates which makes such standard codecs unsuitable for practical applications requiring good visual quality at very low bit rates. These mathematical results confirm the visual perception evaluations of the results of the invention.

Therefore, besides the $x_i$s values, one more value can also be stored to be able to recreate precisely the entire original row or column. The additional memory required is very small overhead when one considers that we are dealing with hundreds or even thousands of pixels for each row and column of images or video frames of typical applications.

By applying such a procedure to every row and column of an image or video frame, the size can be reduced to approximately ¼ of the original that can be reproduced exactly from its reduced version. This process can be repeated on the reduced images or video frames for further size reductions of ¹⁄₁₆, ¹⁄₆₄, etc., of the original.

Of course, this cannot be done indefinitely because the precision of the calculations must be limited in order to avoid increasing the required number of bits instead of reducing it and some information is being lost at each ¼ reduction. However, extensive tests showed that the quality of image reproduction is maintained up to 2 or 3 reduction levels with size reduction of up to 16 or 64 times before compression by the codec. Such levels of compression are very significant in terms of video storage and transmission costs.

Such tests consisted of using a number of diverse uncompressed video clips, i.e., sports, action movies, educational videos, etc, of about 10 minute duration and requiring tens of Gigabytes of storage space for each. Such video clips were then compressed by a number of different codecs as well as by the methods of the invention. The resulting compressed files were compared for size and then decompressed and played back side by side to compare the perceived quality. Such tests clearly demonstrated that methods of the invention can be suitable for providing additional substantial compression of files, and decompression of the files without significant loss of quality. Photographic examples of some of these tests are provided herein as FIGS. 10-21.

The reproduction by any codec of the reduced size frame is precise enough to be able to apply the above calculations for recovery of the original full size frames with similar quality to that of the frames recovered by the codec without the initial frame size reduction step.

Frame Post-Processing and Frame Expansion

This step of the invention can produce high quality full-screen frames for display on a TV set or PC Monitor. Because of the amount of data involved, standard approaches can be very time-consuming and cannot produce high quality enlargements in any case.

The techniques developed to complete the frame expansion methods of the invention can be simple computationally, i.e., fast, and can generate enlarged images of high quality with no pixelization and showing none of the blocking artifacts that plague state-of-the-art techniques. The methods of this invention can be applied repeatedly with similar results and enlargement factors of 4 every time it is applied.

In addition, the process can be further extended by using, after more than 2 or 3 reduction levels, any of the expansion filters disclosed in U.S. Pat. No. 7,317,840 to enlarge very small images with high quality. U.S. Pat. No. 7,317,840 is expressly incorporated fully by reference herein.

Overall enlargement factors of more than 1000 have been demonstrated with such an extension.

The image expansion technique disclosed in such a patent is based on the fact that the given image can be considered to be the level 1 low frequency component of the WT of a higher resolution image which is four times larger. One way to accomplish this is to estimate the missing high frequency WT coefficients of level 1 from the given low frequency coefficients.

A discussion of wavelet theory is provided in "Ten Lectures on Wavelets", I. Daubechies, Society for Industrial and Applied Mathematics, Philadelphia, 1992, incorporated herein fully by reference. However, in brief, wavelets are functions generated from a single function by dilations and translation.

$$\Psi_n^j(x) = \frac{\Psi(2^j x - n)}{\sqrt{2}} \qquad (1)$$

Where j corresponds to the level of the transform, and hence governs the dilation, and n governs the translation.

The basic idea of the wavelet transform is to represent an arbitrary function f as a superposition of wavelets.

$$f = \sum_{j,n} a_n^j(f) \qquad (2)$$

Since the $\Psi_n^j$ constitute an orthonormal basis, the wavelet transform coefficients are given by the inner product of the arbitrary function and the wavelet basis functions:

$$a_n^j(f) = \langle \Psi_n^j, f \rangle \qquad (3)$$

In a multiresolution analysis, one really has two functions: a mother wavelet $\Psi$ and a scaling function $\phi$. Like the mother wavelet, the scaling function $\phi$ generates a family of dilated and translated versions of itself:

$$\phi_n^j(x) = 2^{-j/2} \phi(2^{-j} x - n) \qquad (4)$$

When compressing data files representative of images, it can be desirable to preserve symmetry. As a result, the requirement of an orthogonal basis may be relaxed (although it is not necessary) and biorthogonal wavelet sets can be used. In this case, the $\Psi_n^j$ no longer constitute an orthonormal basis, hence the computation of the coefficients $a_n^j$ is carried out via the dual basis, $$a_n^j(f) = \langle \tilde{\Psi}_n^j, f \rangle \qquad (5)$$

where $\tilde{\Psi}$ is a function associated with the corresponding synthesis filter coefficients defined below.

When f is given in sampled form, one can take these samples as the coefficients $x_n^j$ for sub-band j=0. The coefficients for sub-band j+1 are then given by the convolution sums:

$$X_n^{j+1} = \sum_k h_{2n-k} X_k^j \qquad (6a)$$

for low frequency coefficients; and $$C_n^{j+1} = \sum_k g_{2n-k} X_k^j \qquad (6b)$$

for high frequency coefficients.
This describes a sub-band algorithm with:

$$h_n = \frac{\int \varphi(x-n)\varphi(x)dx}{\sqrt{2}} \qquad (7a)$$

representing a low-pass filter and $$g_1 = (-1)^1 h_{-1+1}, \qquad (7b)$$

representing a high-pass filter. Consequently, the exact reconstruction is given by:

$$X_1^j = \sum_n (\overline{h}_{2n-1} X_n^{j+1} + \overline{g}_{2n-1} C_n^{j+1}), \qquad (8)$$

where $\overline{h}_{2n-1}$ and $\overline{g}_{2n-1}$ represent the reconstruction filters.
The relation between the different filters is given by:

$$g_n = (-1)^n h_{-n+1} \text{ or } g_n = (-1)^{n+1} \overline{h}_{-n+1} (\text{biorthogonal}) \qquad (9a)$$

$$\overline{g}_n = (-1)^n \overline{h}_{-n+1} \text{ or } \overline{g}_n = (-1)^{n+1} h_{-n+1} (\text{biorthogonal}) \qquad (9b)$$

$$\sum_n h_n \overline{h}_{n+2k} = \delta_{k,0} \qquad (9c)$$

(delta function)
where $h_n$ and $g_n$ represent the low-pass analysis filter and the high-pass analysis filter respectively, and $\overline{h}_n$ and $\overline{g}_n$ represent the corresponding synthesis filters.

We now turn to a matrix modified formulation of the one-dimensional wavelet transform. Using the above impulse responses $h_n$ and $g_n$, we can define the circular convolution operators at resolution $2^j$: $H^j$, $G^j$, $\overline{H}^j$, $\overline{G}^j$. These four matrices are circulant and symmetric. The $H^j$ matrices are built from the $h_n$ filter coefficients and similarly for $G^j$ (from $g_n$), $\overline{H}^j$ (from $\overline{h}_n$) and $\overline{G}^j$ (from $\overline{g}_n$).

The fundamental matrix relation for exactly reconstructing the data at resolution $2^{-j}$ is $$H^j \overline{H}^j + G^j \overline{G}^j = I^j \qquad (10)$$

where $I^j$ is the identity matrix.

Let $X^{j+1}$ be a vector of low frequency wavelet transform coefficients at scale $2^{-(j+1)}$ and let $C_x^{j+1}$ be the vector of associated high frequency wavelet coefficients.

We have, in augmented vector form:

$$\begin{vmatrix} x^{j+1} \\ C_x^{j+1} \end{vmatrix} = \begin{vmatrix} H^j & 0 \\ 0 & G^j \end{vmatrix} \times \begin{vmatrix} x^j \\ x^j \end{vmatrix} \qquad (11)$$

where $X^{j+1}$ is the smoothed vector obtained from $X^j$. The wavelet coefficients $C_x^{j+1}$ contain information lost in the transition between the low frequency bands of scales $2^{-j}$ and $2^{-(j+1)}$.

The reconstruction equation is $$X^j = \begin{vmatrix} \underline{H}^j & \underline{G}^j \end{vmatrix} \times \begin{vmatrix} \underline{X}^{j+1} \\ \underline{C}_x^{j+1} \end{vmatrix} \quad (12)$$

Since, from equation (11), $X^{j+1}=H^j X^j$, we can, in principle, recover $\underline{X}^j$ from $\underline{X}^{j+1}$ merely by inverting $H^j$. However, this is generally not practical both because of the presence of inaccuracies in $\underline{X}^{j+1}$ and because $H^j$ is generally an ill-conditioned matrix. As a result, the above problem is ill-posed and there is, in general, no unique solution.

If we discard the high frequency coefficients, $\underline{C}_x^{j+1}$, then equation (12) reduces to $\underline{y}^j = H^j \underline{X}^{j+1}$ which is a blurred approximation of $X^j$.

From equation (11), $\underline{X}^{j+1}=H^j \underline{X}^j$, which gives $$H_t^j \underline{X}^{j+1} = H_t^j H^j \underline{X}^j \quad (13a)$$

or $$\underline{X}^{j+1} = H^j \underline{X}^j. \quad (14)$$

In our problem, the $\underline{X}^{j+1}$ (transformed rows or columns of level j+1) are known and the problem is to determine the $\underline{X}^j$ of the next higher level.

This can be thought of as an image restoration problem in which the image defined by the vector $X^j$ has been blurred by the operator which due to its low-pass nature, is an ill-conditioned matrix.

Regularization, as in "Methodes de resolution des problems mal poses", A. N. Tikhonov and V. Y. Arsenin, Moscow, Edition MIR, incorporated herein fully by reference, is a method used to solve ill-posed problems of this type. This method is similar to a constrained least squares minimization technique.

A solution for this type of problem is found by minimizing the following Lagrangian function:

$$J(\underline{X}^j,\alpha) = |\underline{X}^{j+1} - H^j \underline{X}^j|^2 + \alpha |G^j \underline{X}^j|^2 \quad (15)$$

where $G^j$ is the regularization operator and $\alpha$ is a positive scalar such that $\alpha \to 0$ as the accuracy of $X^{j+1}$ increases.

It is also known from regularization theory that if $H^j$ acts as a low-pass filter, $G^j$ must be a high-pass filter. In other words, since $H^j$ is the low-pass filter matrix of the wavelet transform, $G^j$, must be the corresponding high-pass filter matrix.

Equation (15) may be also written with respect to the estimated wavelet transform coefficients $\underline{C}_x^{j+1}$ and $\underline{\hat{X}}^{j+1}$ (from equation (11)).

$$J=(\underline{X}^j,\alpha) = |\underline{X}^{j+1} - \underline{X}^{j+1}|^2 + \alpha |\underline{C}_x^{j+1}|^2. \quad (16)$$

Using the exact reconstruction matrix relation shown in Equation 10, we get:

$$\underline{X}^{j+1} = H^j \overline{H}^j \underline{X}^{j+1} + G^j \overline{G}^j \underline{X}^{j+1} \quad (16a)$$

Also, we can write $$\underline{\hat{X}}^{(j+1)} = H^j \underline{X}^j = H^j(\overline{H}^j \underline{X}^{(j+1)} + \overline{G}^j \underline{C}_x^{(j+1)}) \text{(keep in mind that } \underline{X}^j \text{ is estimated.)} \quad (16b)$$

Then subtracting (16b) from (16a) gives:

$$\underline{X}^{j+1} - \underline{\hat{X}}^{j+1} = G^j \overline{G}^j \underline{X}^{j+1} - H^j \overline{G}^j \underline{C}_x^{(j+1)} \quad (16c)$$

Substituting (16c) into (16) results in:

$$J(\underline{C}_x^{(j+1)},\alpha) = |G^j \overline{G}^j \underline{X}^{j+1} - H^j \overline{G}^j \underline{C}_x^{(j+1)}|^2 + \alpha |\underline{C}_x^{j+1}|^2 \quad (17)$$

By setting the derivative of J with respect to $\underline{C}_x^{j+1}$, equal to zero, we can obtain the following estimate for the high frequency coefficients $\underline{C}_x^{j+1}$:

$$\underline{C}_x^{j+1} = M \underline{X}^{j+1} \quad (18)$$

where the estimation matrix M is given by $$M = |\alpha I + \overline{G}_t^j H_t^j H^j \overline{G}^j|^{-1} \overline{G}_t^j H_t^j G^j \overline{G}^j \quad (19)$$

In which the subscript "t" refers to the matrix transpose.

Since the goal is to calculate an estimate of $\underline{X}^j$ from $\underline{X}^{j+1}$, using equation (12), we can write $$\underline{X}^j = T \underline{X}^{j+1} \quad (20)$$

where $T$ is the matrix $$T = +\overline{H}^j + \overline{G}^j M \quad (21)$$

In other words, it is not necessary to calculate the high frequency coefficients $\underline{C}_x^{j+1}$, although their determination is implicit in the derivation of the matrix T.

One can appreciate that, since we are dealing with a decimated Wavelet Transform, the matrix T is not square, but rather, it is rectangular. Its dimensions are $n \cdot n/2$ where n is the size of the data before any given level of transformation. This can be verified from the following sizes for the Wavelet Transform matrices: H and G are $n/2 \cdot n$ matrices and $\overline{H}$ and $\overline{G}$ are $n \cdot n/2$. Notice that $\alpha I + G_t H_t H G$ is a square matrix of size $n/2 \cdot n/2$ and is invertible if $\alpha > 0$ for all wavelet filters.

Another aspect of this invention is the structure of the matrix T. The rows of T are made up of just two short filters that repeat themselves every two rows with a shift to the right of one location. All other elements of the matrix T are zero. This means that every level of the Wavelet Transform can be recreated from the previous level (of half the size) by convolving both filters centered at a specific location of the available data with such data. This results in two new values from every given value thus doubling the size of the data at every level of signal decompression or expansion. There is no need to multiply the matrix T with the given vector. The two filters depend on the coefficients of the wavelet filters used to transform the original data in the case of compression while any wavelet filter coefficients can be used to determine the two expansion filters. The most significant criteria being quality and speed.

For example, for a Daubechies-6 wavelet, the two filters that make up the matrix T are:
$x_1 = 0.04981749973687$
$x_2 = -0.19093441556833$
$x_3 = 1.141116915831444$ and
$y_1 = -0.1208322083104$
$y_2 = 0.65036500052623$
$y_3 = 0.47046720778416$
and the T matrix is:

| | | | | | |
|---|---|---|---|---|---|
| $x_1$ | $x_2$ | $x_3$ | | | $0's$ |
| 0 | $y_1$ | $y_2$ | $y_3$ | | $0's$ |
| 0 | $x_1$ | $x_2$ | $x_3$ | | $0's$ |
| 0 | 0 | $y_1$ | $y_2$ | $y_3$ | $0's$ |
| 0 | 0 | $x_1$ | $x_2$ | $x_3$ | $0's$ |

$T =$ (with rows as above), etc.

Using other wavelet bases, similar expansion filters can be obtained. The following Table 2 provides the wavelets and lengths of filters obtained with a Matlab program of for some typical wavelets.

TABLE 2

| Wavelet | Expansion Filters Lengths |
| --- | --- |
| Daubechies - 4 | 2 |
| Daubechies - 6 | 3 |
| Daubechies - 8 | 4 |
| Biorthogonal | 3-4 |
| Asymmetrical | 2 |

It can be appreciated that better expansion quality can be obtained using longer filters, whereas naturally shorter filters can provide faster expansion.

It is important to notice that these expansion filters do not depend on the size of the data. By contrast, the undecimated Wavelet Transform results in full matrices with no zeros and whose elements change with the size of the data.

Thus, the practical advantages of the method disclosed in this patent are obvious in terms of computational complexity and capability to recreate signals with high quality from low frequency information alone.

With respect to images and video frames, the method is applied first to columns and then to rows. Also, for color images, the method is applied separately to the luminance (Y) and the chrominance (UV) components.

The procedures of the invention can be extended to other wavelets in addition to the Haar Wavelet, although the calculations are more complicated and time consuming. In some embodiments, the corresponding equations for the WT and IWT lead to a sparse system of linear equations in which only a small number of its matrix elements are non-zero, resulting in a band diagonal matrix in which the width of the band depends on the number of Wavelet coefficients. There are software packages applicable to such systems, e.g., Yale Sparse Matrix Package, but the Haar method above provides the quality and speed that make such more complicated approaches unnecessary for situations in which real-time processing is an important requirement.

Take for example the Daubechies-4 Wavelet with low-frequency coefficients:

$a4 = 0.4829629131445341/\sqrt{2}$
$a3 = 0.8365163037378077/\sqrt{2}$
$a2 = 0.2241438680420134/\sqrt{2}$
$a1 = -0.1294095225512603/\sqrt{2}$ and high frequency coefficients $b4 = a1$
$b3 = -a2$
$b2 = a3$
$b1 = -a4$ The coefficients for the inverse wavelet transform are:
Low Frequency:
$aa4 = -0.1294095225512603 * \sqrt{2}$
$aa3\ 0.2241438680420134 * \sqrt{2}$
$aa2 = 0.8365163037378077 * \sqrt{2}$
$aa1 = 0.4829629131445341 * \sqrt{2}$
High Frequency
$bb4 = -aa1$
$bb3 = aa2$
$bb1 = -aa3$
$bb1 = aa4$ Similarly to the case of the Haar Wavelet, we can express the values of the pixels, $y_i$'s, of a row or a column of an image or video frame given the values of their low frequency WT, $x_i$'s, and the values of their high frequency WT, $z_i$'s, as $y_0 = aa_4 x_0 + aa_2 x_1 + bb_4 z_0 bb_2 z_1$ $y_1 = aa_3 x_1 + aa_1 x_2 + bb_3 z_1 + bb_1 z_2$ $y_2 = aa_4 x_1 + aa_2 x_2 + bb_4 z_1 + bb_1 z_2$ $y_3 = aa_3 x_2 + aa_1 x_3 + bb_3 z_2 + bb_1 z_3$ etc.

$y_{2n-2} = aa_4 x_{n-1} + aa_2 x_0 + bb_4 z_{n-1} + bb_2 z_0$ $y_{2n-1} = aa_3 x_0 + aa_1 x_1 + bb_3 z_0 + bb_1 z_1$ (wraparound)

but we have that $z_0 = b_4 y_{2n-3} + b_3 y_{2n-2} + b_2 y_{2n-1} b_1 y_0$ (wraparound)

$z_1 = b_4 y_{2n-1} + b_3 y_0 + b_2 y_1 + b_1 y_2$ $z_2 = b_4 y_1 + b_3 y_2 + b_2 y_3 + b_1 y_4$ etc.

$z_{n-2} = b_4 y_{2n-6} + b_3 y_{2n-5} + b_2 y_{2n-4} + b_1 y_{2n-3}$ $z_{n-1} = b_4 y_{2n-4} + b_3 y_{2-3} + b_2 y_{2n-2} + b_1 y_{2n-1}$

Therefore we have a system of equations in hundreds or thousands of variables in which most of the coefficients are zero, i.e., a sparse diagonal linear system. As indicated, there are packages to solve such systems but the Haar Wavelet provides the fastest and most efficient way to reconstruct an image from its low frequency WT. Therefore, using other wavelets is unnecessary and not cost-effective.

These and other embodiments can be used to produce high-quality replay of video images arising from a number of different sources. For example, movies, and live telecasts (e.g., news broadcasts).

EXAMPLES

The following examples are being presented to illustrate specific embodiments of this invention. It can be appreciated that persons of ordinary skill in the art can develop alternative specific embodiments, based upon the disclosures and teachings contained herein. Each of these embodiments is considered to be part of this invention.

Example 1

Frame Reduction and Expansion Techniques

As above indicated, the application of the decimated Haar WT to a given video frame results in a frame that is ¼ the original size because only the low-frequency Haar wavelet filter is applied. It has been proven above that the high-frequency Haar wavelet filter need not be applied if just the last original value before wavelet transformation of a row or column pixel is saved. With this information, all the preceding original pixels of a row or column can be calculated exactly.

This process can be repeated again on the resulting reduced frame for additional sized reduction to ¹⁄₁₆ of the original and so on. This process is described in detail below.

Example 2

One-Level Frame Size Reduction and Expansion Back to the Original Size

Figure 4:
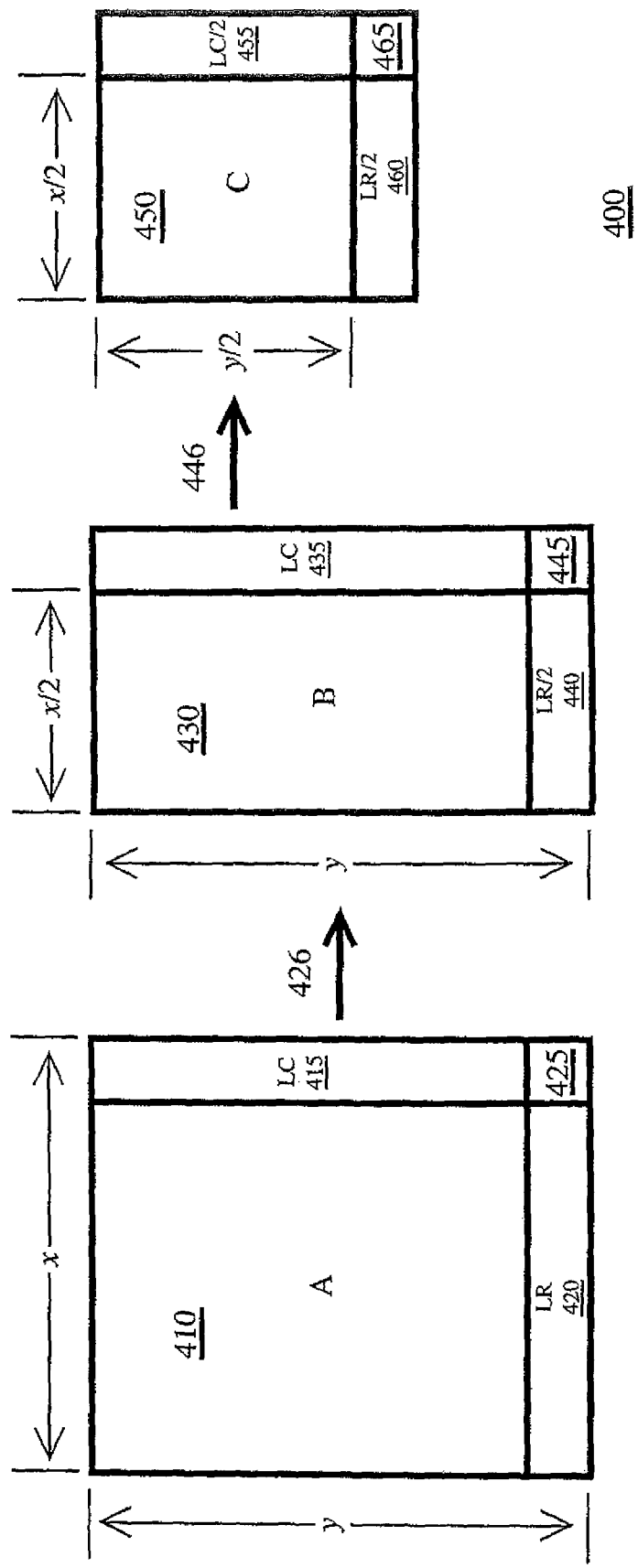
FIG. 4 shows a process of frame size reduction of an embodiment of the invention by the application of a low-frequency Haar Wavelet Filter to the rows and columns of a video frame.

FIG. 4 depicts drawing 400 showing a one-level frame size reduction to ¼ of its original size according to an embodiment of this invention. Frame A 410 has horizontal dimension x and vertical dimension y. Column LC 415 and row LR 420 are identified, and pixel (X) 425 is shown. First step 426 is horizontal frame reduction, producing Frame B 430, having horizontal dimension x/2 and vertical dimension y. Column (LC) 435 and row. (LR/2) 440 are identified, as is pixel X 445. Second step 446 is vertical frame reduction, producing Frame C 450, having horizontal size x/2 and vertical size y/2. Column (LC/2) 455, row (LR/2) 460 and pixel (X) 465 are identified.

In FIG. 4, "A" is the original frame with dimensions x and y. The decimated low-pass Haar WT is applied to A horizontally, resulting in a frame "B" of dimensions (x/2) and y. The last column of A, i.e., ("LC"), is copied to the last column of B, x/2+1.

Next, the decimated low-pass Haar WT is applied to the (x/2)+1 columns of B resulting in frame "C" of dimensions (x/2)+1 and (y/2). The last row of B, i.e., ("LR/2"), is copied to the last row of C, i.e., y/2+1. Notice that pixel X (R, G, B, or Y, U, V component) is kept through this process. LR/2 is the decimated WT of LR and LC/2 is the decimated WT of LC.

Figure 5:
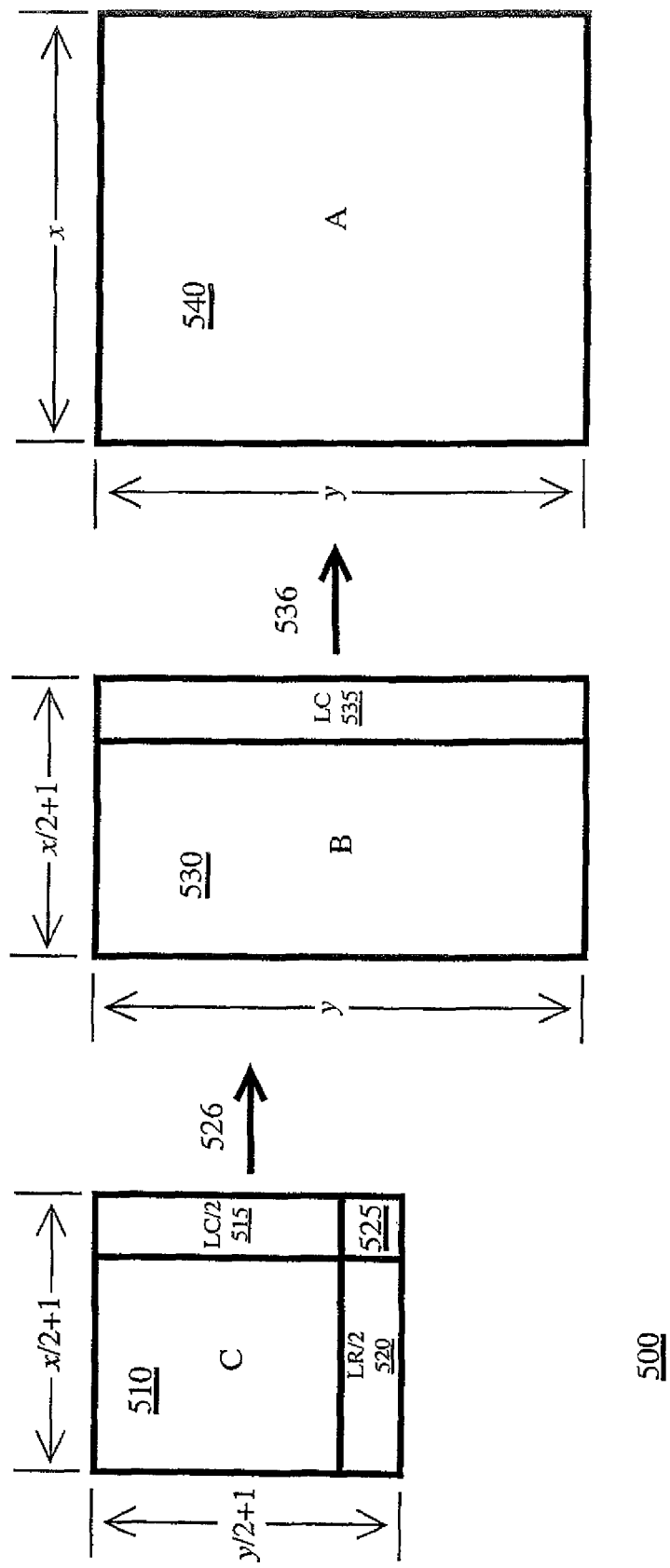
FIG. 5 shows a process of an embodiment of the invention for recovering the original size of a video frame by the application of a recovery algorithm of this invention to a previously reduced frame.

The process of recovering the original frame from C of FIG. 4 is shown in FIG. 5. First the last row of C is used to precisely recover the columns of B using the frame post-processing reconstruction calculations disclosed above. Finally, the reconstruction method is applied to B horizontally starting with the values of LC reconstructed from the value of X using the reconstruction calculations from right to left to recover A exactly.

This procedure can be interfaced to any existing codec (as part of the research of this invention, it has been applied with similar results to the most popular codecs, (i.e., MPEG-4, H.264, VC-1, DivX) to improve its compression performance significantly (60% to 80% reduction in storage and transmission costs for all extensively tested video files) with minimal loss of video quality compared to that produced by the original codec after decompression. First, a frame pre-processing size reduction process of an embodiment of the invention is applied to the original frames of a given video file. Then, a codec is applied to each frame in the given video file. Application of methods of this invention produces a much smaller file than without the frame pre-processing size reduction step. The resulting compressed video file of this invention can then be stored and/or transmitted at a greatly reduced cost.

An implementation of a one level frame pre-processing step of an embodiment of the invention corresponds to the pseudocode below:

```
- For every row in input frame pFrameIn
{
    o   Compute the decimated low-frequency Haar WT for consecutive
        pixels
    o   Store in half the width of pFrameIn the resulting values
    o   At end of row, store the last pixel unchanged
}
- For every 2 consecutive rows in modified pFrameIn
{
    o   Compute the decimated low frequency Haar WT of
        corresponding pixels in the 2 rows column by column
    o   Store the resulting values in output frame pFrameOut
    o   Advance row position by 2
}
```

Store the last row of the modified pFrameIn in pFrameOut last row.

This process produces a reduced frame of ¼ the size of the original frame.

Optionally, an implementation of a second level step includes the additional instruction:

Repeat with pFrameOut as the input for this step.

Using a second level step reduces the size of the frame to ¹⁄₁₆ of the original size.

Optionally, an implementation of a third level step includes the additional instruction:

Repeat with pFrameOut of the previous step as the input for this step.

Using a third level step reduces the size of the frame to ¹⁄₆₄ of the original size.

In this description, the computation of the decimated low-frequency Haar WT simply involves taking the average of two consecutive pixels, i.e., the average of each of their components (Y, U, V or R, G, B), and making such average the value of the WT in the corresponding position as we move along the rows of the image first and then down the columns of the WT of the rows. This WT of the original image results in a new image that looks very much like the original but at ¼ its size.

An implementation of a one level frame post-processing step of this invention corresponds to the pseudocode below:

```
- Copy last row of input frame pFrameIn into intermediate output frame
  Img with the same pixels per row as pFrameIn and double the number of
  rows.
- For each pixel position of pFrameIn and Img
{
    o   Calculate the new pixel values of 2 rows of Img starting at the
        bottom and moving up column by column according to the
        formulas
        y_{2n} = (2x_n + y_{2n+1})/3  and
        y_{2n-1} = (4x_n - y_{2n+1})/3
        (the x's represent pixels of pFrameIn and the y's represent pixels
        of Img)
    o   Store the calculated pixels in Img
}
- For every row of Img
{
    o   Start with the last pixel and store it in the last pixel of the
        corresponding row of the output frame pFrameOut
    o   Compute the pixels of the rest of the row from right to left
        according to the above formulas where now the x's represent the
        pixels of Img and the y's represent the pixels of pFrameOut
    o   Store the calculated pixels in pFrameOut
}
```

This one level post-processing step increases the size of the frame by 4-fold compared to the input frame size.

Optionally, to provide a second level post-processing, an embodiment of this invention includes the following step:

Repeat with pFrameOut of the previous level being the input in this case.

This produces a frame that is 16-fold larger than the original input frame.

Optionally, to provide a third level post-processing, an embodiment of this invention further includes the step:

Repeat with pFrameOut of the previous level being the input of this level.

This produces a frame that is 64-fold larger than the original input frame.

In this description, the resulting pFrameOut is an almost identical reproduction of the original image before the frame pre-processing step of size reduction because of the formulas of the invention used in the computation of the new pixels.

For decompression and display, the codec is applied for decompression and then the above frame post-processing or size expansion procedure of an embodiment of the invention is used prior to displaying high-quality video in its original full-size.

FIG. 5 depicts a drawing 500 showing a one-level frame size expansion according to an embodiment of this invention.

Reduced Frame C 510 has horizontal size x/2+1 and vertical size y/2+1. Frame C 510 has Column 515 and Row 520, with pixel (X) 525 shown. Vertical expansion step 526 produces Frame B 530, having a horizontal dimension x/2+1 and vertical dimension y. Column (LC) 535 is identified. Horizontal expansion step 536 produces Frame A 540 having horizontal dimension x and vertical dimension y as in the original frame.

Because of the lossy compression of existing standard video codecs, there is some minor loss of video quality compared to the original before compression by the codec but the methods of the invention described here do not result in any perceived degradation of quality when compared to that produced by the codec on its own from a much larger file.

Example 3

Multiple-Level Frame Size Reduction and Expansion

The process of embodiments of the invention described in FIGS. 4 and 5 can be continued by one or more levels starting with the C frame instead of the A frame. There are additional right columns and bottom rows to be saved but they are one half the sizes of the previous level and, consequently, they don't appreciably detract from the saving in storage and transmission bandwidth.

Figure 6:
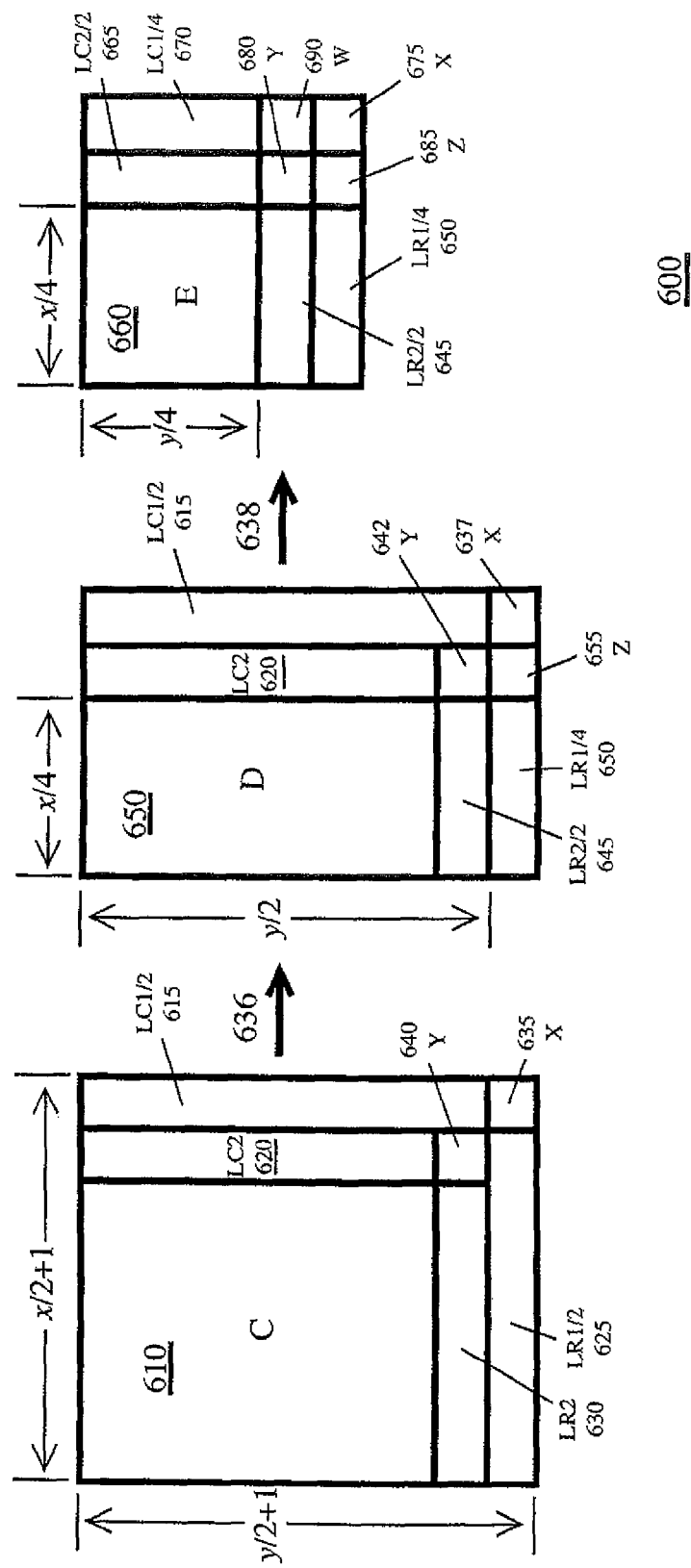
FIG. 6 shows a process of an embodiment of the invention for reducing the frame size one more level compared to the process shown in FIG. 4.

FIG. 6 depicts a drawing 600 of a two-level size reduction according to an embodiment of this invention including another level of frame reduction compared to FIG. 4. In FIG. 6, frame C 610 has horizontal dimension x/2+1 and vertical dimension y/2+1. Columns (LC2) 620 and (LC1/2) 615 are identified. Rows (LR2) 630 and (LR1/2) 625 are also identified. Pixels (X) 635 and (Y) 640 are identified. By application of size reduction step 636 in the horizontal dimension, frame D 650 is produced, having horizontal dimension x/4 and vertical dimension y/2. Columns (LC2) 620 and (LC1/2) 615 are identified, as are rows (LR2/2) 645 and (LR1/4) 650. Pixels (X) 637, (Y) 642 and (Z) 655 are shown. With size reduction step 638 in the vertical direction, frame E 660 is produced, having horizontal dimension x/4 and vertical dimension y/4. Columns (LC2/2) 665 and (LC1/4) 670, rows (LR2/2) 645 and (LR1/4) 650 are shown. Pixels (X) 675, (Y) 680, (Z) 685 and (W) 690 are also shown.

Figure 7:
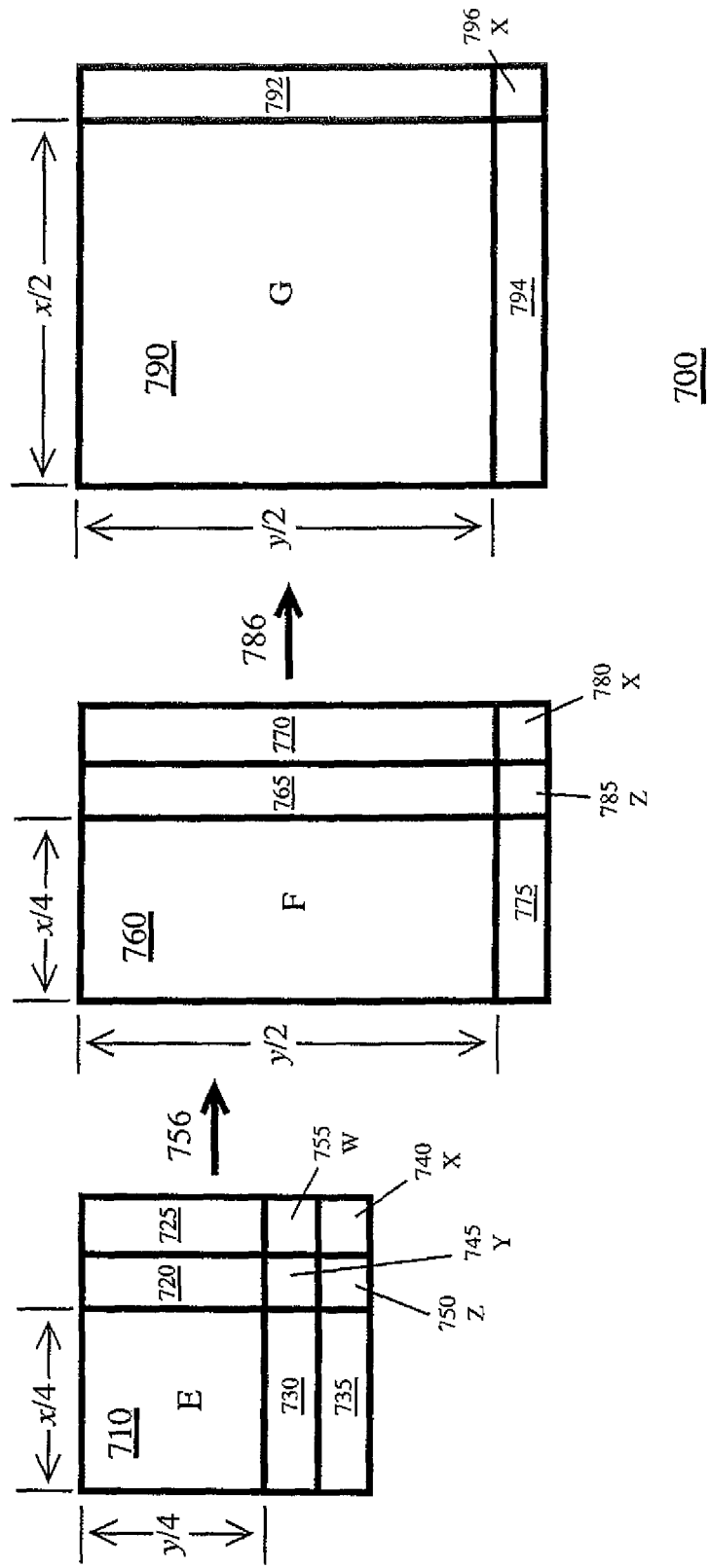
FIG. 7 shows expansion by one-level of a two-level sized reduction of an embodiment of the invention. The original full size can then be recovered by the process of FIG. 5.

FIG. 7 depicts drawing 700 of a one-level expansion of a two-level reduction according to an embodiment of this invention. Frame E 710 has horizontal dimension x/4 and vertical dimension y/4. Columns 720 and 725, Rows 730 and 735, and pixels (X) 740, (Y) 745, (Z) 750 and (W) 755 are shown. Application of frame expansion step 756 in the vertical dimension (vertical frame post-processing), produces frame F 760 having horizontal dimension x/4 and vertical dimension y/2. Columns 765 and 770, Row 775, and Pixels (X) 780 and (Z) 785 are shown. With horizontal expansion step 786 (horizontal frame post-processing), frame G 790 is produced having horizontal dimension x/2 and vertical dimension y/2. Column 792, Row 794 and Pixel (X) 796 are shown.

Figure 8:
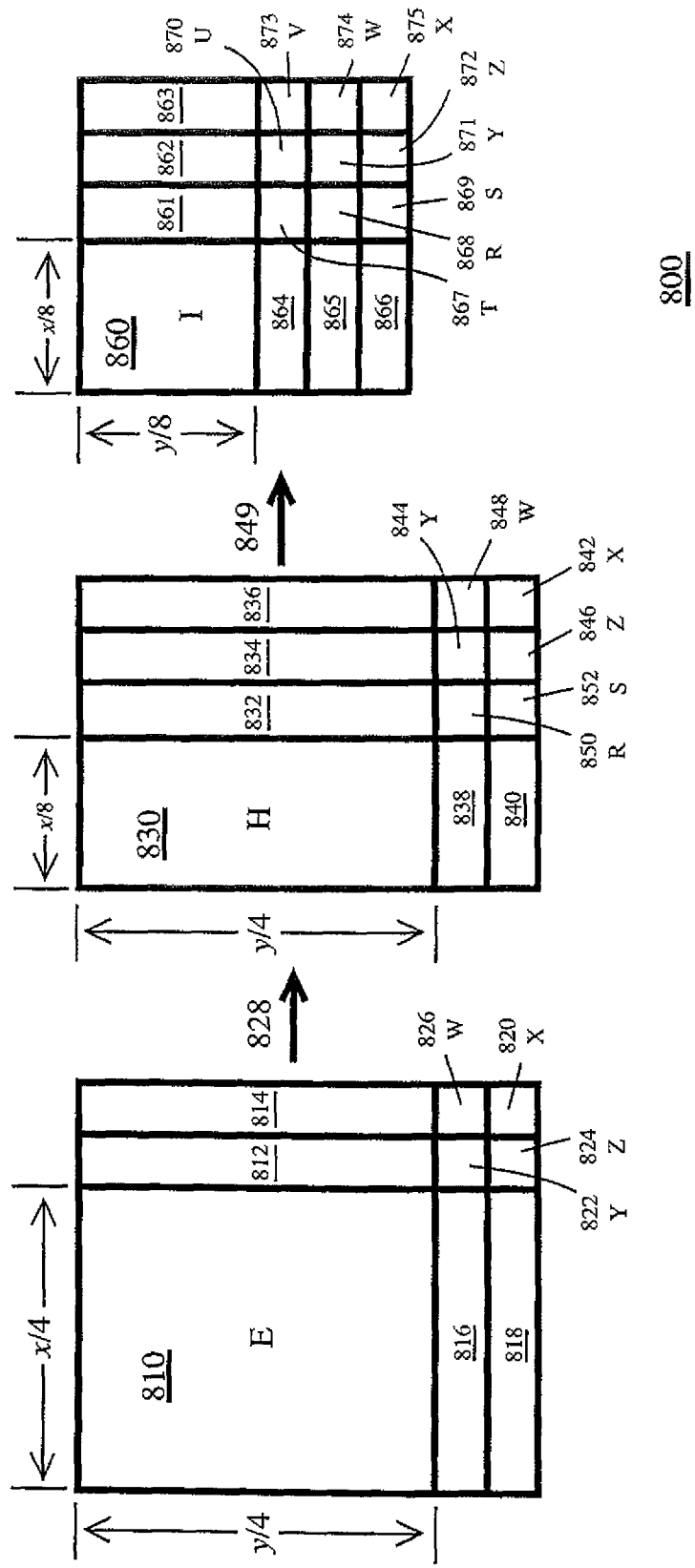
FIG. 8 shows a process of an embodiment of the invention for going from 2-Level frame size reduction to 3-Level frame size reduction.

FIG. 8 depicts drawing 800 of a three-level size reduction according to an embodiment of this invention. Frame E 810 has horizontal dimension x/4 and vertical dimension y/4. Columns 812 and 814, Rows 816 and 818, and Pixels (X) 820, (Y) 822, (Z) 824 and (W) 826 are shown. With horizontal size reduction step 828, frame H 830 is produced, having horizontal dimension x/8 and vertical dimension y/4. Columns 832, 834 and 836, Rows 838 and 840, and Pixels (X) 842, (Y) 844, (Z) 846, (W) 848, (R) 850 and (S) 852 are shown. With additional vertical size reduction step 849, frame I 860 is produced, having horizontal dimension x/8 and vertical dimension y/8. Columns 861, 862 and 863, Rows 864, 865 and 866, and Pixels (T) 867, (R) 868, (S) 869, (U) 870, (Y) 871, (Z) 872, (V) 873, (W) 874 and (X) 875 are shown.

Figure 9:
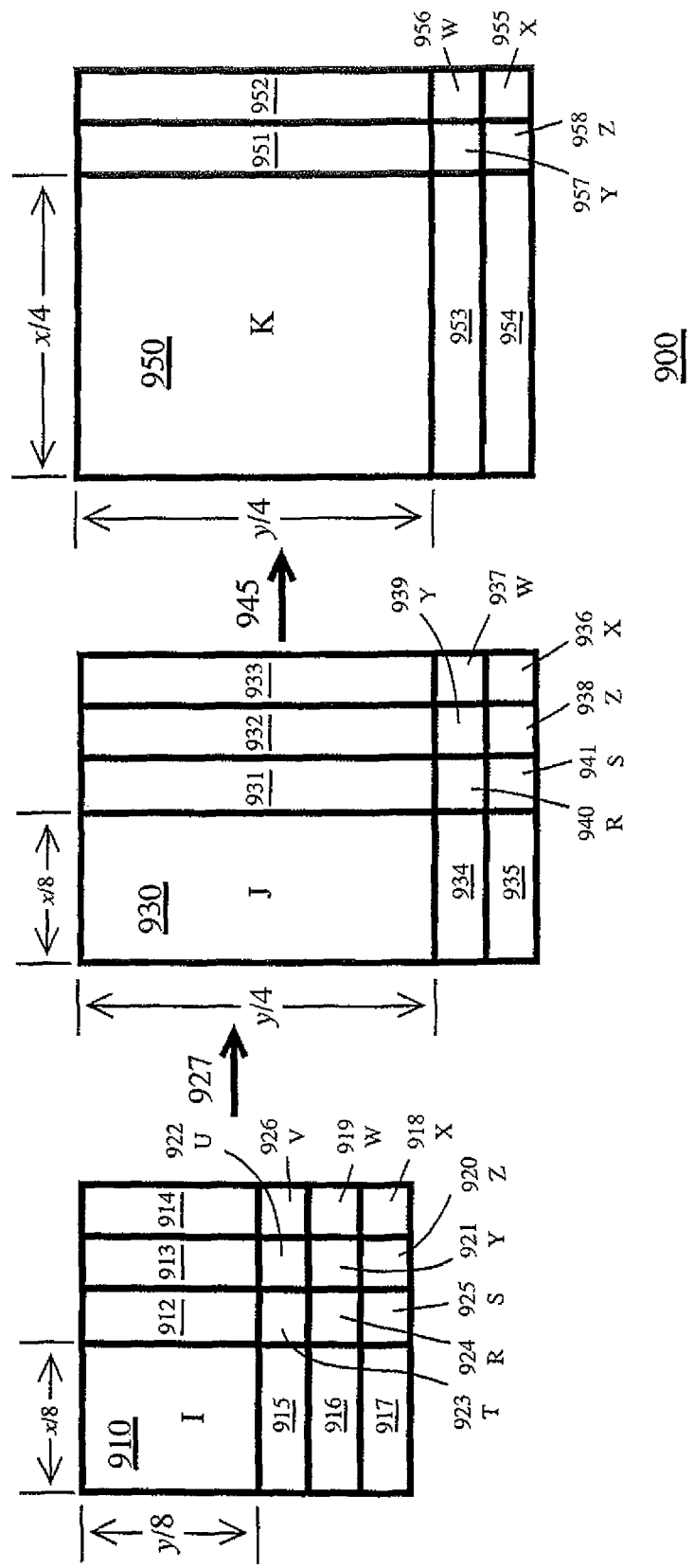
FIG. 9 shows a process of an embodiment of this invention for frame size expansion from 3-Level size reduction to 2-Level size reduction. Additional levels of expansion can be handled similarly.
Figure 10:
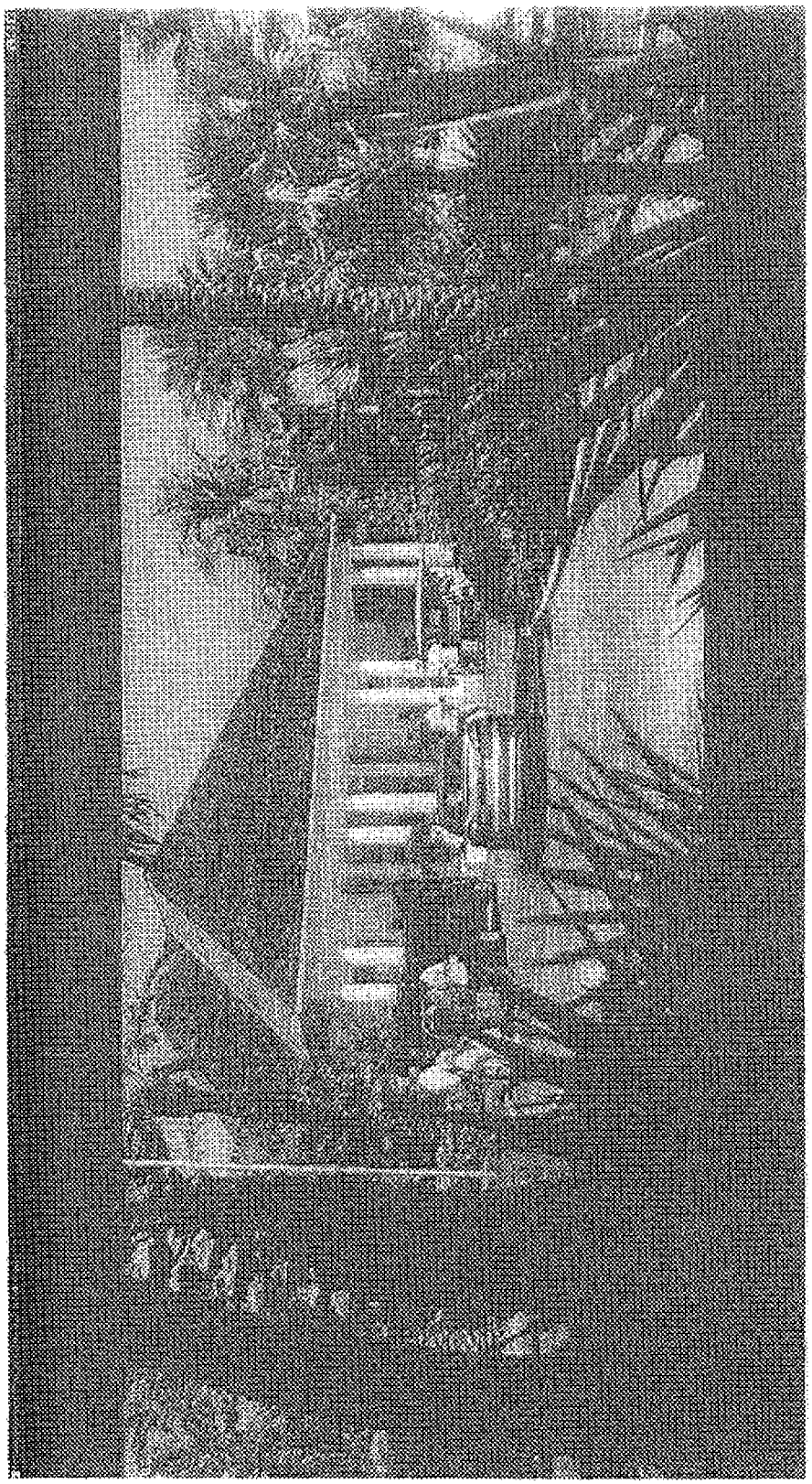
FIG. 10 shows a photograph of a video frame, of 1080i video compressed by H264 to 6 Mbps and then decompressed and displayed.
Figure 11:
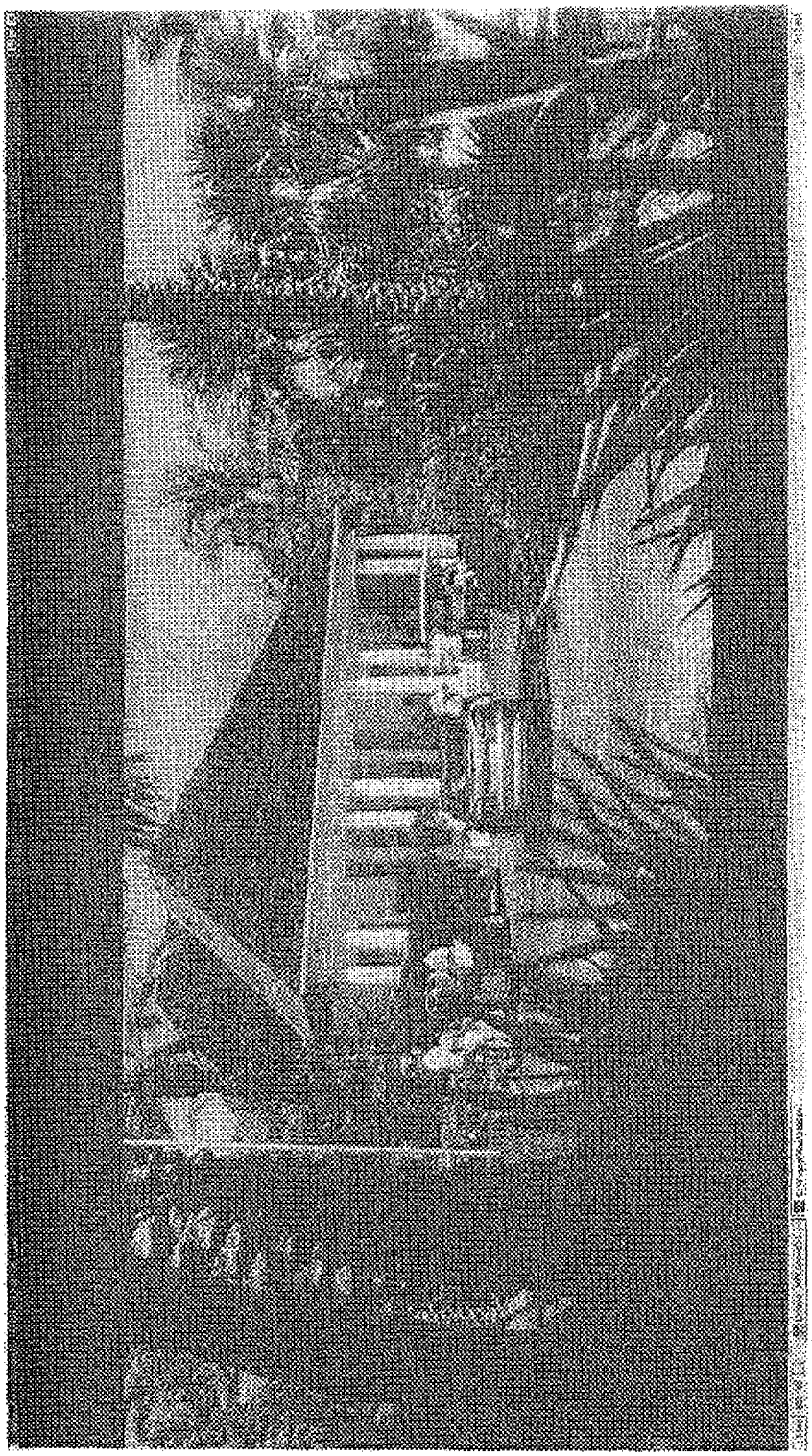
FIG. 11 shows a photograph of the codec-processed image of the photograph shown in FIG. 10 compressed by H264 with pre-processing according to an embodiment of this invention to 3 Mbps and then decompressed, post-processed and displayed.
Figure 12:
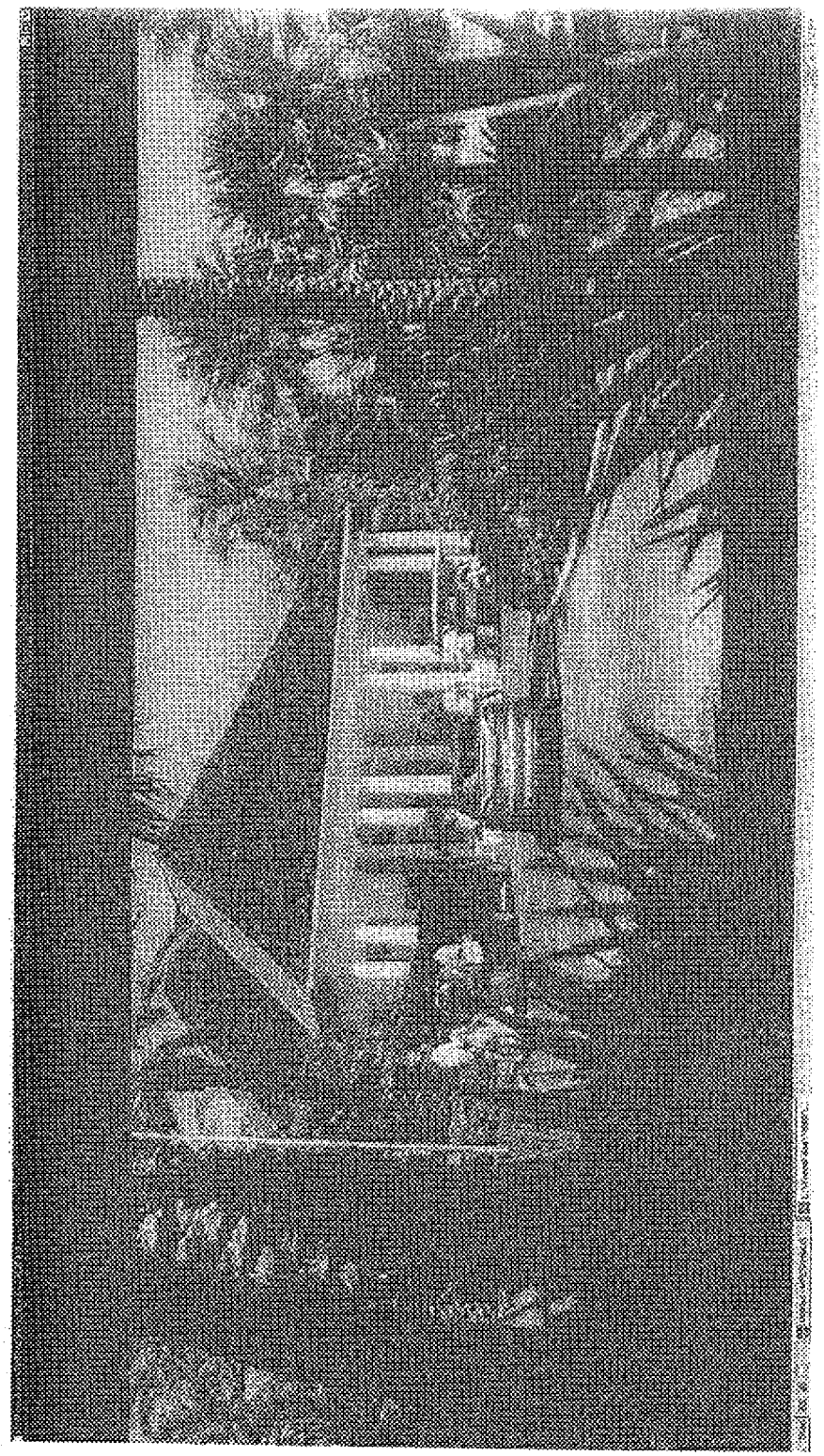
FIG. 12 shows a photograph of the frame shown in FIG. 10 compressed by H264 with pre-processing according to an embodiment of this invention to 1.5 Mbps and then decompressed, post-processed and displayed.
Figure 13:
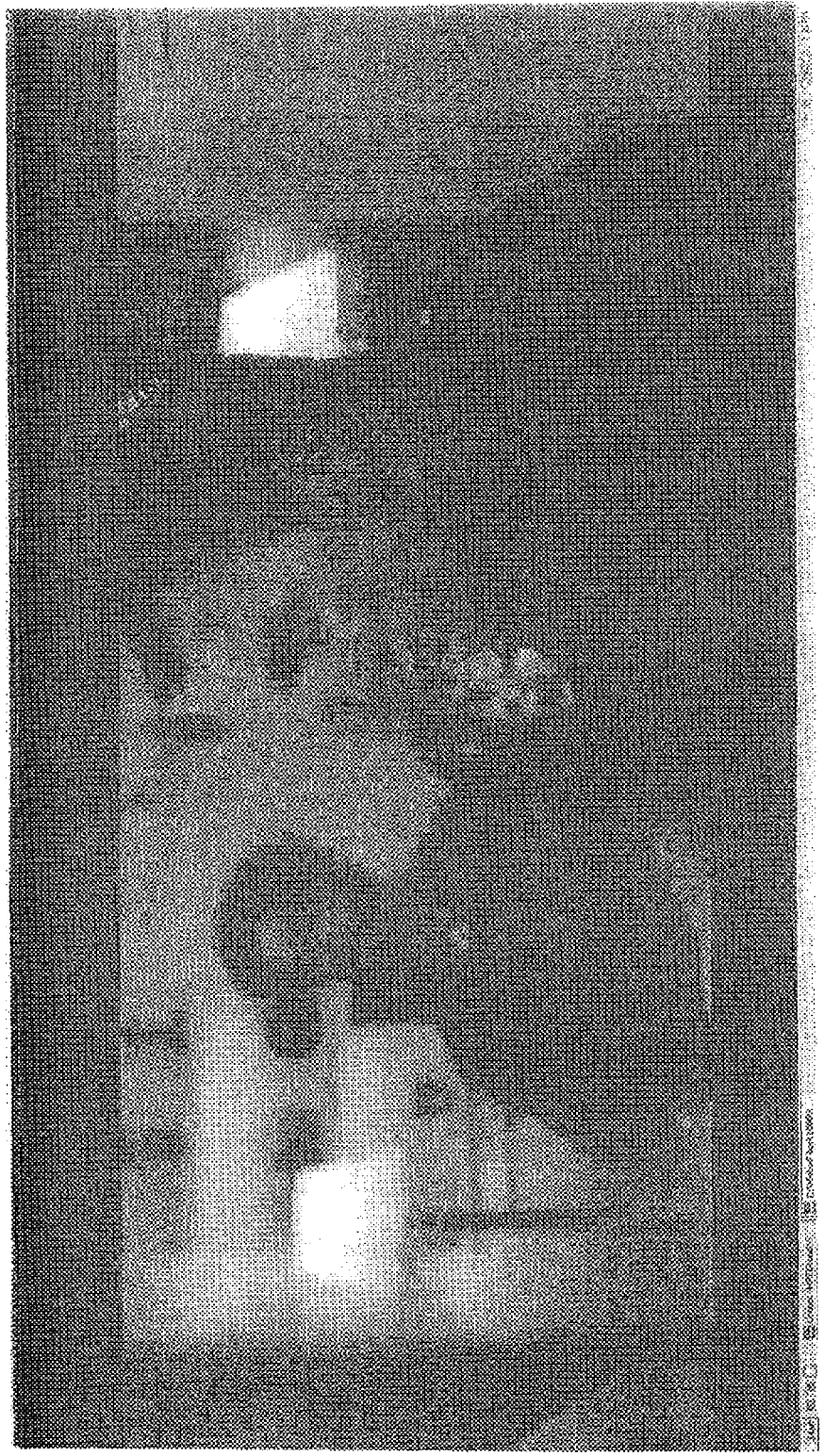
FIG. 13 shows a photograph of a frame of 1080i video compressed by VC-1 to 6 Mbps and then decompressed and displayed.
Figure 14:
FIG. 14 shows a photograph of the same frame as in FIG. 13 compressed by VC-1 after pre-processing according to an embodiment of this invention to 3 Mbps and then decompressed, post-processed and displayed.
Figure 15:
FIG. 15 shows a photograph of the same frame as in FIG. 12 compressed by VC-1 after pre-processing according to an embodiment of this invention to 1.5 Mbps and then decompressed, post-processed and displayed.
Figure 16:
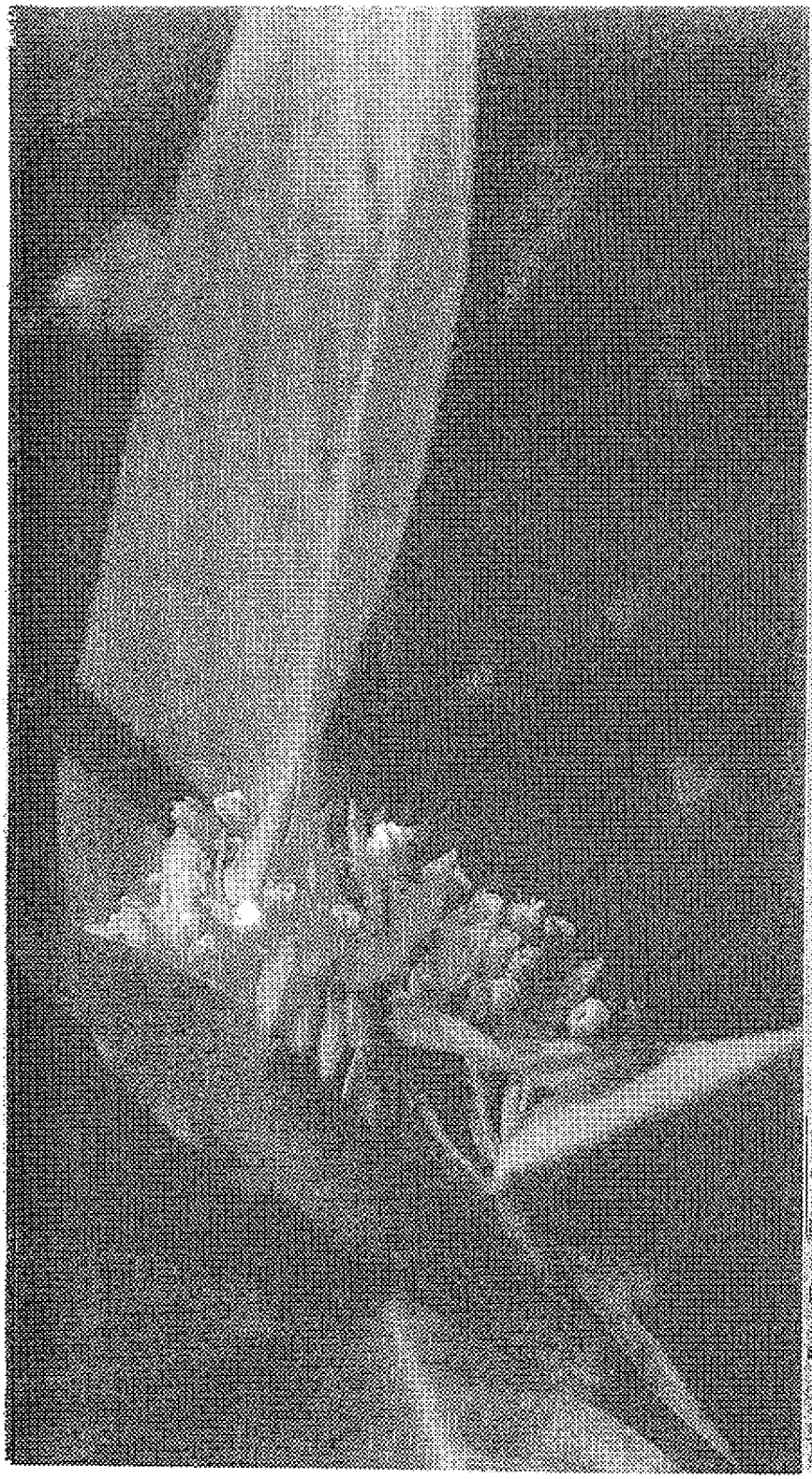
FIG. 16 shows a photograph of a frame of 1080i video compressed by H264 to 6 Mbps and then decompressed and displayed.
Figure 17:
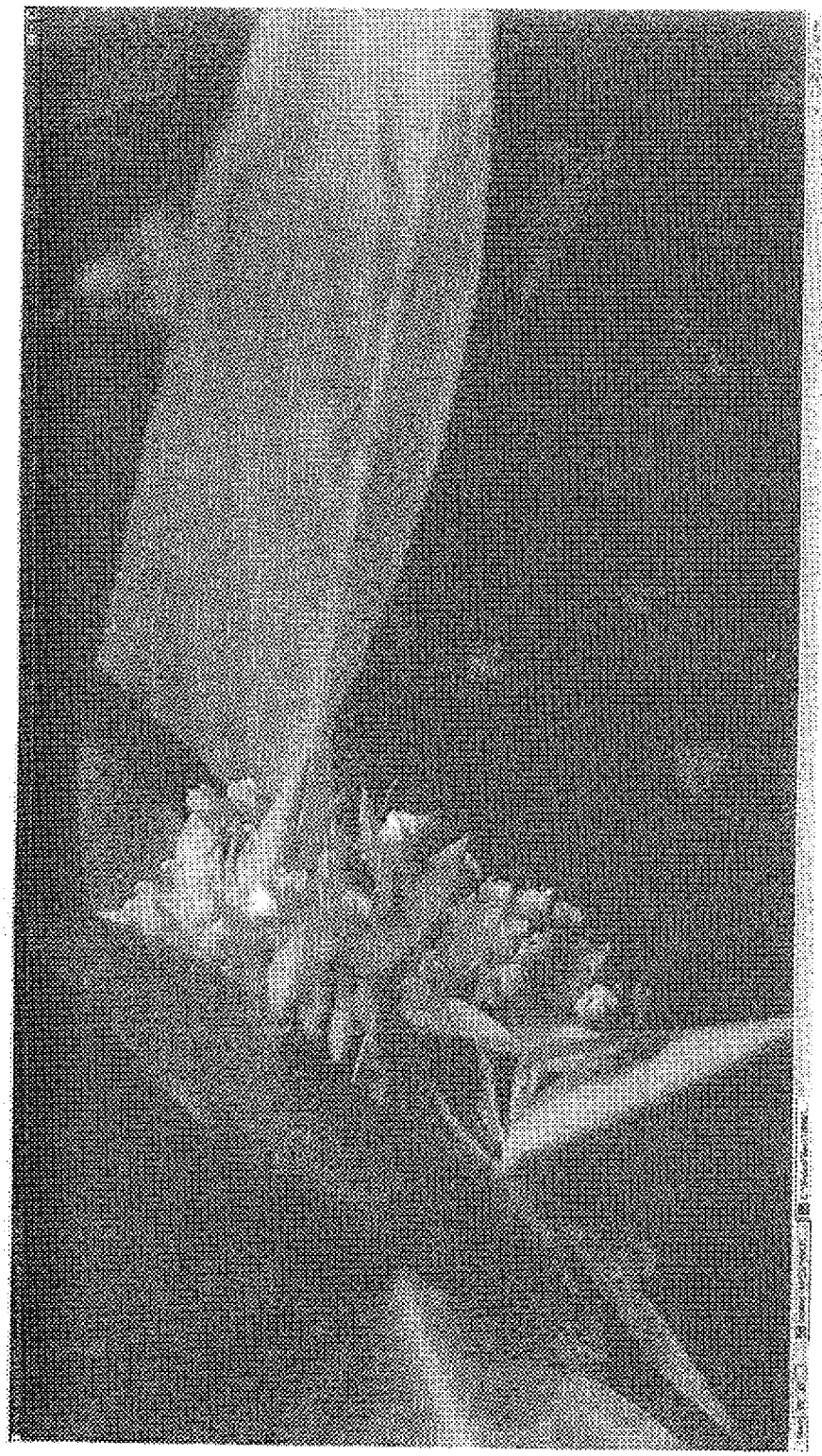
FIG. 17 shows a photograph of the frame shown in FIG. 16 compressed by H264 with pre-processing according to an embodiment of this invention to 3 Mbps and then decompressed, post-processed and displayed.
Figure 18:
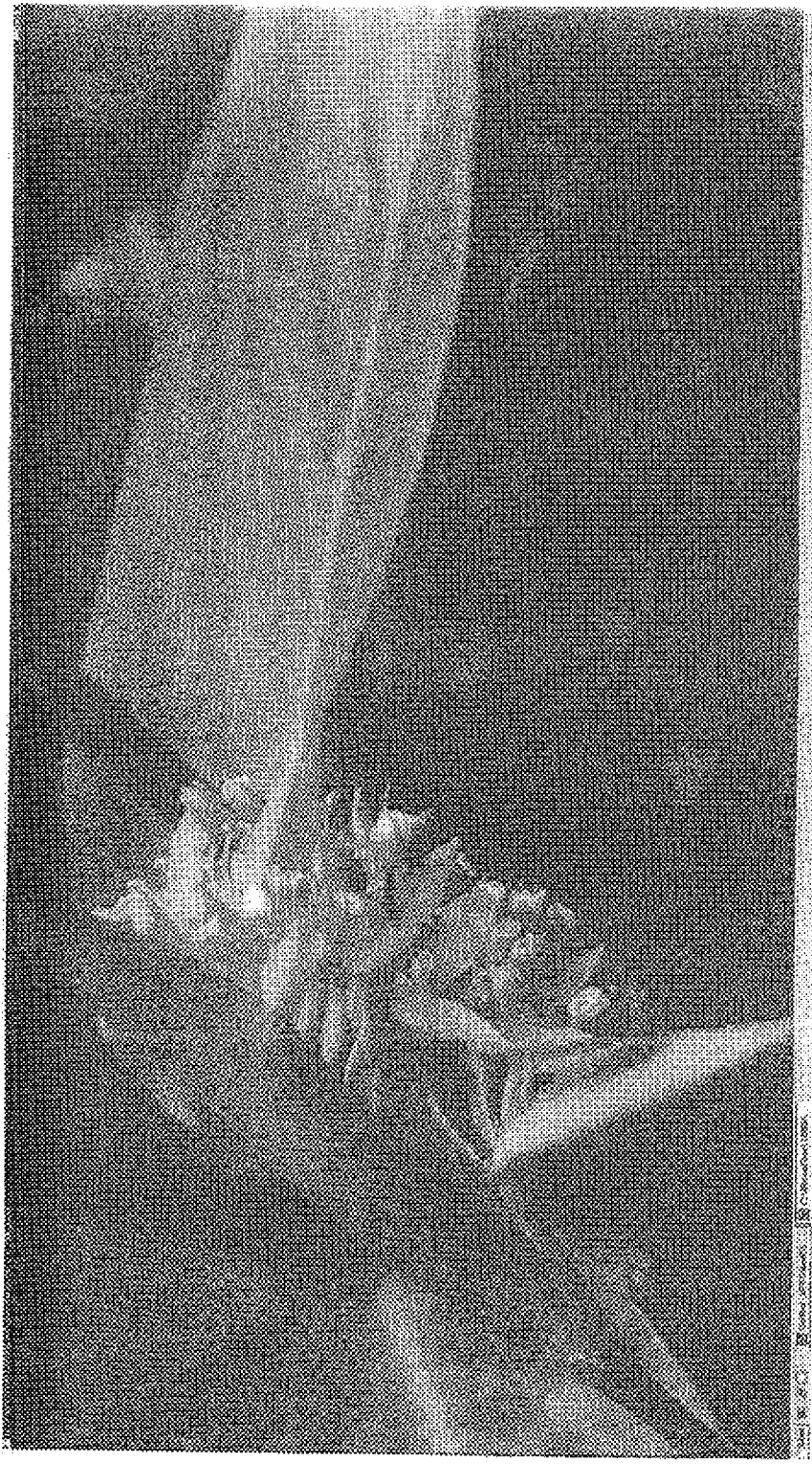
FIG. 18 shows a photograph of the same frame as shown in FIG. 16 compressed by H264 and pre-processed according to an embodiment of this invention to 1.5 Mbps and then decompressed, post-processed and displayed.
Figure 19:
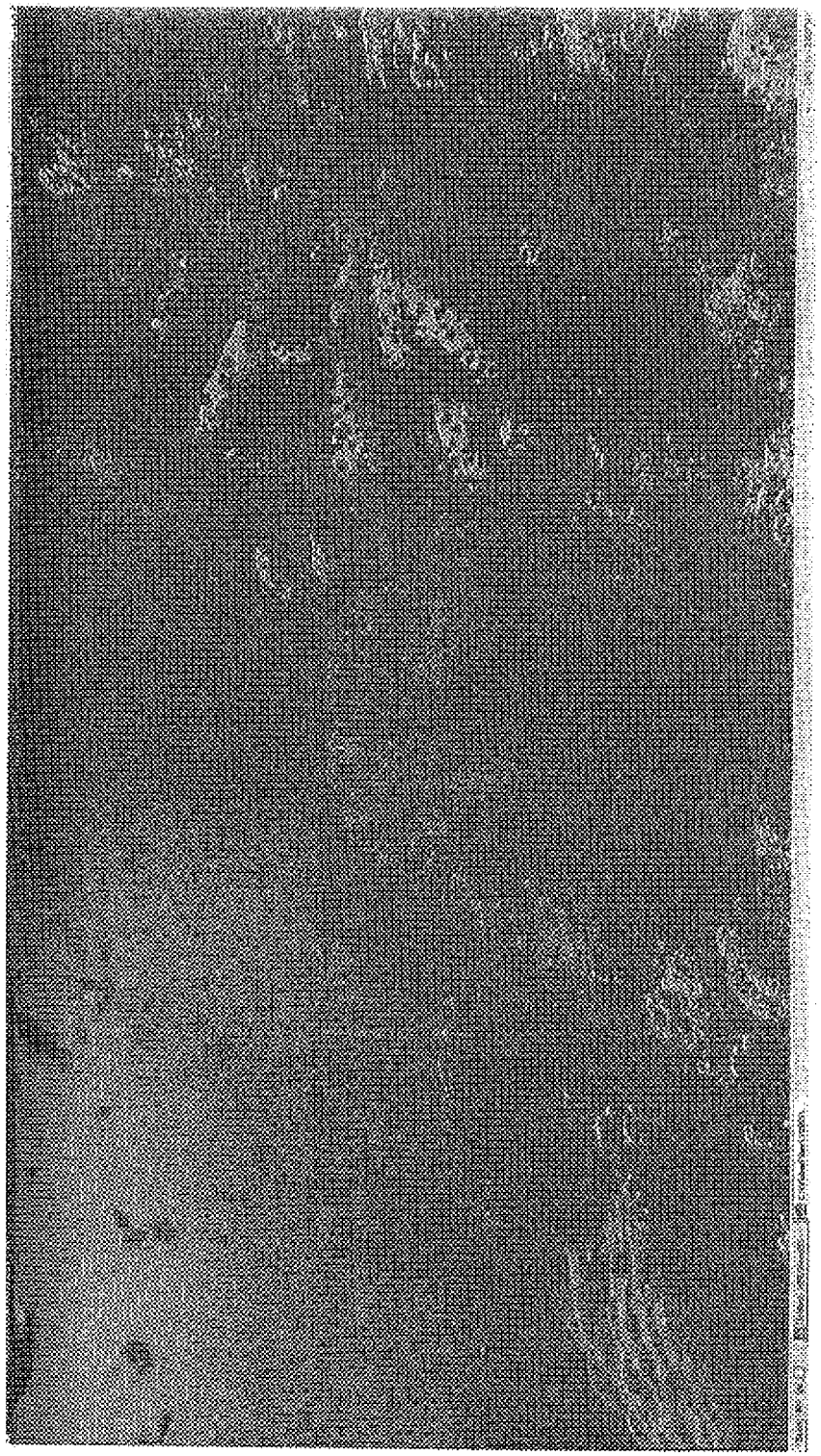
FIG. 19 shows a photograph of a frame of 1080i video compressed by H264 to 6 Mbps and then decompressed and displayed.
Figure 20:
FIG. 20 shows a photograph of the same frame as in FIG. 19 compressed by H264 and pre-processed according to an embodiment of this invention to 3 Mbps and then decompressed, post-processed and displayed.
Figure 21:
FIG. 21 shows a photograph of the same frame as in FIG. 19 compressed by H264 and pre-processed according to an embodiment of this invention to 1.5 Mbps and then decompressed, post-processed and displayed.

FIG. 9 depicts drawing 900 of a one-level frame expansion of a three-level frame reduction according to an embodiment of this invention. Frame I 910 has horizontal dimension x/8 and vertical dimension y/8. Columns 912, 913 and 914, and Rows 915, 916 and 917 are shown. Pixels (X) 918, (W) 919, (V) 926, (U) 922, (Y) 921, (Z) 920, (T) 923, (R) 924 and (S) 925 are shown. Application of frame expansion step 927 in the vertical dimension produces frame J 930. Frame J 930 has horizontal dimension x/8 and vertical dimension y/4. Columns 931, 932 and 933, and Rows 934 and 935, and Pixels (X) 936, (W) 937, (Y) 939, (Z) 938, (R) 940 and (S) 941 are shown. Application of frame expansion step 945 in the horizontal dimension produces frame K 950. Frame 950 has horizontal dimension x/4 and vertical dimension y/4. Columns 951 and 952, Rows 953 and 954, and Pixels (X) 955, (W) 956, (Y) 957 and (Z) 958 are shown.

It can be appreciated that similar approaches can be applied to provide additional levels of reduction and expansion without departing from the scope of this invention.

Modes of Operation

The above ideas and methods can be implemented in a number of different ways. For example, (1) frame size reduction of only one level but codec compression at different levels of bit assignment per compressed frame; and (2) frame size reduction of multiple levels and codec bit assignment as a function of the reduced frame size of the different levels.

Example 4

Frame Pre-Processing Code

This Example provides one specific way in which the principles of this invention can be implemented to pre-process frames in the horizontal and vertical dimensions to reduce their size prior to compression and decompression using a codec.

```
Void CAviApi : : RCBFrameReduce( int x. int y. int nFrames. Unsigned char* pFrameIn
unsigned char * pFrameOut )
{
Unsigned char *pFin0. *pFin1. *pFin2 :
int szin.i, j, k01.k02.k1.k2ix:
szin=3*(x/2) *y:
unsigned char *Fin2=(unsigned char *) malloc(sizeof (unsigned char) *szin):
//unsigned char *Fin3(unsigned char *) malloc(sizeof (unsigned char) *szin):
pFin0=pFrameIn:
pFin1=pFin2:
//pFin2=pFin3:
pFrameIn=pFin0+6:
```

-continued

```
/////////////////////////////////HORIZONTAL//////////////////////////////
I=0:
while (i<y) {
    j=1:
    while (j<x/2) {
        Fin2[0] = (pFrameIn[0]>>1)+(pFrameIn[3]>>1):
        Fin2[1] = (pFrameIn[1]>>1)+(pFrameIn[4]>>1):
        Fin2[2] = (pFrameIn[2]>>1)+(pFrameIn[5]>>1):
        pFrameIn += 6:
        Fin2 +=3:
    J++: }
pFrameIn-=3:
Fin2[0]=pFrameIn[0]:
Fin2[1]=pFrameIn[1]:
Fin2[2]=pFrameIn[2]:
pFrameIn+=9:
Fin2+=3:
j++: }
//CopyMemory(Fin3.Fin2.szin):
/////////////////////////////////VERTICAL//////////////////////////////
Fin2=pFin1:
i=1:
while (i<y/2) }
    j=0:
    while (j<x/2) {
        pFrameOut[0]=(Fin2[0]>>1)+(Fin2[3*x/2]>>1):
        pFrameOut[1]=(Fin2[1]>>1)+(Fin2[1+3*x/2]>>1):
        pFrameOut[2]=(Fin2[2]>>1)+(Fin2[2+3*x/2]>>1):
//      pFrameOut[0]=(*pFin1)>>1+(*pFin2)>>1:
//      pFrameOut[1]=(*pFin1+1))>>1+(*(pFin2+1))>>1:
//      pFrameOut[2]=(*pFin1+2))>>1+(*(pFin2+2))>>1:
pFrameOut+=3:
Fin2+=3:
//pFin1+=3:
//pFin2+=3:
j++: }
Fin2+=3*x/2:
//pFin1+=3*x/2:
//pFin2+=3*x/2:
i++: }
Fin2-=3*x/2:
//pFin1-=3*x/2:
memcpy(pFrameOut.Fin2.3*x/2):
//memcpy(pFrameOut.pFin1.3*x/2):
////////////////////////////////////////////
}
////////////////////////////////////////////////////////////////////
////////////////////////////////////////////
```

Example 5

Frame Post-Processing Code

This Example provides one specific way in which the principles of this invention can be implemented to post-process frames in the horizontal and vertical dimensions to expand their size after decompression of a video file using a codec.

```
void CAviApi : :RGBFrameExpand(int x. int y. int nFrames. Unsigned
char* pFrameIn.
unsigned char * pFrameOut)
(
////////////////////////////////////////////
int sz2=y:
int sz01=x*4: // bytes/row RGB
int sz:
unsigned char *Img=(unsigned char *) malloc(sizof (unsigned
char)*sz2*sz01*2):
//int swnhnce=6:
//int n=swnhnce:
//int swADC4:
float temp:
//float cnhncfctr:
//float Y.U.V.Frmx:
unsigned char Zero[8]:
int i.j.jx.ix.k01.k02.k1.k2.k3.lim.lim1:
unsigned char *es0.*es1.*es2.*es3.*es4.*es5.*es6.*es7.*es8:
unsigned char *es5j.es6j.es7j.es8j:
char *ces3.*ces4.*ces9:
unsigned char *esi1.*esi2.*esi3
char *cesi3:
/////////////////VERTICAL////////////////
#pragma omp parallel shared(sz.sz2.sz01.Img.pFrameIn)
private(k1.k2.es0.es1.j.ix.i.temp.es3)
{
////////////////////////////////////////////
sz=2*sz2:
////////////////////////////////////////////
k1=(sz2-1)*sz01:
k2=(sz-1)*sz01:
es1=&Img[k2]:
es0=&pFrameIn[k1]:
memcpy(es1.es0.sz01):
////////////////////////////////////////////
ix=sz-2:
i=sz2-2:
while (i>0) {
    j=0:
    while (j<sz01) {
```

```
k1=j+1*sz01:
k2=j+ix*sz01:
es1=&Img[k2]:
es0=&pFrameIn[k1]:
////////////////////////////////////
temp=((float)(2* ( *es0)+(*(es1+sz01))))/3.0:
if (temp>255.0) temp=255.0:
*es1=(unsigned char) temp:
temp=((float) (2* ( * (es0+1)) + (* (es1+1+sz01))))/3.0:
if (temp>255.0) temp=255.0:
*(es1+1)=(unsigned char) temp:
temp=((float)(2* ( * (es0+2))+(*(es1+2+sz01))))/3.0:
if (temp>255.0) temp=255.0:
*(es1+2)=(unsigned char) temp:
temp=((float)(2*(*(es0+3))+(*(es1+3+sz01))))/3.0:
if (temp>255.0) temp=255.0:
*(es1+3)=(unsigned char) temp:
////////////////////////////////////
j+=4: }
////////////////////////////////////
ix--;
    j=0
    while (j<sz01){
k1=j+i*sz01:
k2=j+(ix+1)*sz01:
k3=j+ix*sz01:
es1=&Img[k2]:
es0=&pFrameIn[k1]:
es3=&Img[k3]:
////////////////////////////////////
temp=((float) (4*(es0)-(*(es1+sz01))))/3.0:
if (temp<0.0) temp=0.0:
else if (temp>255.0) temp=255.0:
*es3(unsigned char) temp:
temp=((float)(4*(*(es0+1))-(*(es1+1+sz01))))/3.0:
if (temp<0.0)temp=0.0:
else if (temp>255.0) temp=255.0:
*(es3+1) = (unsigned char) temp:
temp = ((float)(4*(*(es0+2)) - (*(es1+2+sz01))))/3.0:
if (temp<0.0) temp=0.0:
else if (temp>255.0) temp=255.0:
*(es3+2)=(unsigned char) temp:
temp=((float)(4*(*(es0+3)) - (*(es1+3+sz01))))3.0:
if (temp<0.0) temp=0.0:
else if (temp>255.0) temp=255.0:
*(es3+3)=(unsigned char) temp:
////////////////////////////////////
j+=4: }
////////////////////////////////////
jx - - :
i - - : }
////////////////////////////////////
j=0:
while (j<sz01) {
    Img[j]=(5*Img[j+sz01]) >> 1- (3*Img[j+3*sz01])>>1:
////////////////////////////////////
}
//////////////////////////VERTICAL//////////////////////////
////////////////////////////////////
/////////////////////////HORIZONTAL/////////////////////////
////////////////////////////////////
#pragma omp parallel shared(sz.sz01.Img.pFrameOut)
private(i.k01.k02.jx.j.k1.k2.es2.es1.temp.es3)
{
////////////////////////////////////
i=01:
while (i<sz) {
    k01=i*sz01:
    k02=i*2*sz01:
jx=2*sz01-4:
j=sz01-4:
k1=k01+j:
k2=k02+jx:
es1=&Img[k1]:
es2=&pFrameOut[k2]:
memcpy(es2.es1.4):
j-=4:
jx-=4:
while (j>0) {
k1=k01+j:

k2=k02+jx:
es1=&Img[k1]:
es2=&pFrameOut[k2]:
////////////////////////////////////
temp=((float) (2*(*es1) + (*(es2+4))))/3.0:
if (temp>255.0) temp=255.0:
*es2=(unsigned char) temp:
temp=((float) (2*(*(es1+1))+(*(es2+5))))/3.0:
if (temp>255.0) temp=255.0:
*(es2+1)=(unsigned char) temp:
temp=((float) (2*(*(es1+2))+(*(es2+6))))/3.0:
if (temp>255.0) temp = 255.0:
*(es2+2)=(unsigned char) temp:
temp=((float) (2*(*(es1+3))+(*(es2+7))))/3.0:
if (temp>255.0) temp=255.0:
*(es2+3)=(unsigned char) temp:
////////////////////////////////////
jx-=4:
k3=k02+jx:
es3=&pFrameOut[k3]:
////////////////////////////////////
temp=((float) (4*(*es1) - (*(es3+4))))/3.0:
if (temp<0.0) temp=0.0:
else if (temp>255.0) temp=255.0:
es3=(unsigned char) temp:
temp=((float) (4*(*(es1+1))-(*(es3+5))))/3.0:
if (temp<0.0) temp=0.0:
else if (temp>255.0) temp=255.0:
*(es3+1)=(unsigned char) temp:
temp=((float) (4*(*(es1+2)) - (*(es3+6))))/3.0:
if (temp<0.0) temp=0.0:
else if (temp>255.0) temp=255.0:
*(es3+2)=(unsigned char) temp:
temp=((float) (4*(*(es1+3)) - (*(es3+7))))/3.0:
if (temp<0.0) temp=0.0:
else if (temp>255.0) temp=255.0:
*(es3+3)=(unsigned char) temp:
////////////////////////////////////
jx-=4:
j-=4: }
////////////////////////////////////
k2=k02:
es2&pFrameOut[k2]:
*es2=(5*(*(es2+4)))>>1-(3*(*(es2+12)))>>1:
*(es2+1)=(5*(*(es2+5)))>>1-(3*(*(es2+12)))>>1:
*(es2+2)=(5*(*(es2+6)))>>1-(3*(*(es2+13)))>>1:
*(es2+2)=(5*(*(es2+7)))>>1-(3*(*(es2+14)))>>1:
??????????????????????????????????????????????????
i++: }
//////////////////////////HORIZONTAL//////////////////////////
}
////////////////////////////////////
if(Img) delete Img:
////////////////////////////////////
}
////////////////////////////////////
```

Example 6

Comparison of Some Video Codecs Compressed Using Methods of this Invention

Table 3 below presents working examples of video compression improvements of some widely used standard video codecs through application of methods of this invention, without loss of video quality for any given codec. Note that the methods of this invention are applicable to HD 1080i and 1080p videos, HD 720p videos, and SD480i videos, as examples, as well as any other formats.

TABLE 3

Improvement of Video Codec Compression Capabilities
Typical Results for MPEG-4, H-264, VC-1

| HD 1080i Videos | Original Size | Codec-Compressed (6 Mbps) | Codec + Invention Level 1 | Codec + Invention Level 2 | Codec + Invention Level 3 |
|---|---|---|---|---|---|
| Living Landscapes | 37.5 GB | 232.3 MB | 118.8 MB | 81.3 MB | 62.5 MB |
| Yellowstone | 39.6 GB | 244.75 MB | 125.4 MB | 85.7 MB | 65.9 MB |
| Planet Earth | 75 GB | 462.6 MB | 237.3 MB | 162.3 MB | 124.75 MB |
| Over America | 42 GB | 240.2 MB | 132.6 MB | 90.8 MB | 69.8 MB |

| HD 720p Videos | Original Size | Codec-Compressed (5 Mbps) | Codec + ADC2 Level 1 | Codec + ADC2 Level 2 | Codec + ADC2 Level 3 |
|---|---|---|---|---|---|
| KABC | 48.76 GB | 267.86 MB | 139.94 MB | 98.36 MB | 77.7 MB |

| SD 480i Videos | Original Size | Codec-Compressed (4 Mbps) | Codec + ADC2 Level 1 | Codec + ADC2 Level 2 | Codec + ADC2 Level 3 |
|---|---|---|---|---|---|
| Football | 6.5 GB | 157.3 MB | 81.7 MB | 56.5 MB | 43.9 MB |
| Basketball | 6.5 GB | 157 MB | 73.9 MB | 55.6 MB | 43.8 MB |
| Tennis | 8.1 GB | 196.9 MB | 92.55 MB | 70.8 MB | 55 MB |
| King Kong clip | 1.3 GB | 31.3 MB | 16.25 MB | 11.2 MB | 8.7 MB |
| Line of Fire clip | 20 GB | 482.3 MB | 250.5 MB | 173.3 MB | 134.7 MB |

Example 7

Further Levels of Size Reduction and Expansion with Wavelet-Based Methods

The results described in Examples 4 through 6 can be further improved by additional levels of frame size reduction by using for expansion to the previous level any of the filters obtained from the calculations disclosed in U.S. Pat. No. 7,317,840. For example, using a biorthogonal wavelet, the two resulting filters
and

| −0.0575 | 1.1151 | −0.0575 | 0.0 |
| −0.0912 | 0.591 | 0.591 | −0.0912 | are convolved consecutively with the rows of a given image or frame to convert every pixel to two pixels of each new expanded row. The process is then repeated vertically column by column to obtain an expanded frame that is four times larger than the original frame.

In additional embodiments, other wavelet based expansion filters can be used, for example, the expansion filters of Table 2.

Such wavelet-based filters can be applied to the data of Table 3 to further reduce the video file sizes to about ⅛ and about 1/16 of the size produced by any of the codecs of the Table 3 with little or no perceptible loss in video quality.

Example 8

Results of Application of Methods of this Invention

It can be seen from the preceding Table 3 that the size reductions of video files compressed using the techniques of this invention are about ¼, ⅓, ¼ (depending on the level of size reduction) of the compressed files using the codecs alone. The perceived qualities of the decompressed videos for the different reduction levels are indistinguishable from that of the decompressed videos produced by the codec alone for all the codecs.

FIGS. 10 through 21 show examples of frame quality produced by a given codec and by the same codec enhanced by pre-processing and post-processing according to methods of this invention. Any differences in quality are clearly imperceptible.

FIGS. 10 through 21 are arranged in sets of three each, wherein the first figure of each set (i.e., FIG. 10, FIG. 13, FIG. 16, and FIG. 19 represent photographs of video frames that have been compressed using only a codec to a compression of 6 Mbps.

The second figure of each set (i.e., FIG. 11, FIG. 14, FIG. 17 and FIG. 20) represent photographs of video frames shown in FIGS. 10, 13, 16 and 19, respectively, that have been pre-processed using methods of this invention, then compressed by the codec, decompressed by the codec and finally post-processed using methods of this invention to provide a compression to 3 Mbps.

The third figure in each set (i.e., FIG. 12, FIG. 15, FIG. 18, and FIG. 21) represent photographs of video frames shown in FIGS. 10, 13, 16 and 19, respectively, that have been pre-processed using methods of this invention, then compressed by the codec, decompressed by the codec and finally post-processed using methods of this invention to provide a compression to 1.5 Mbps.

It can be readily appreciated that the quality of the images of the second and third figure of each of the above sets are of high quality, and show little, if any, perceptible degradation of image quality.

Example 9

System for Implementing Pre-Processing, Codecs, and Post-Processing

Figure 22:
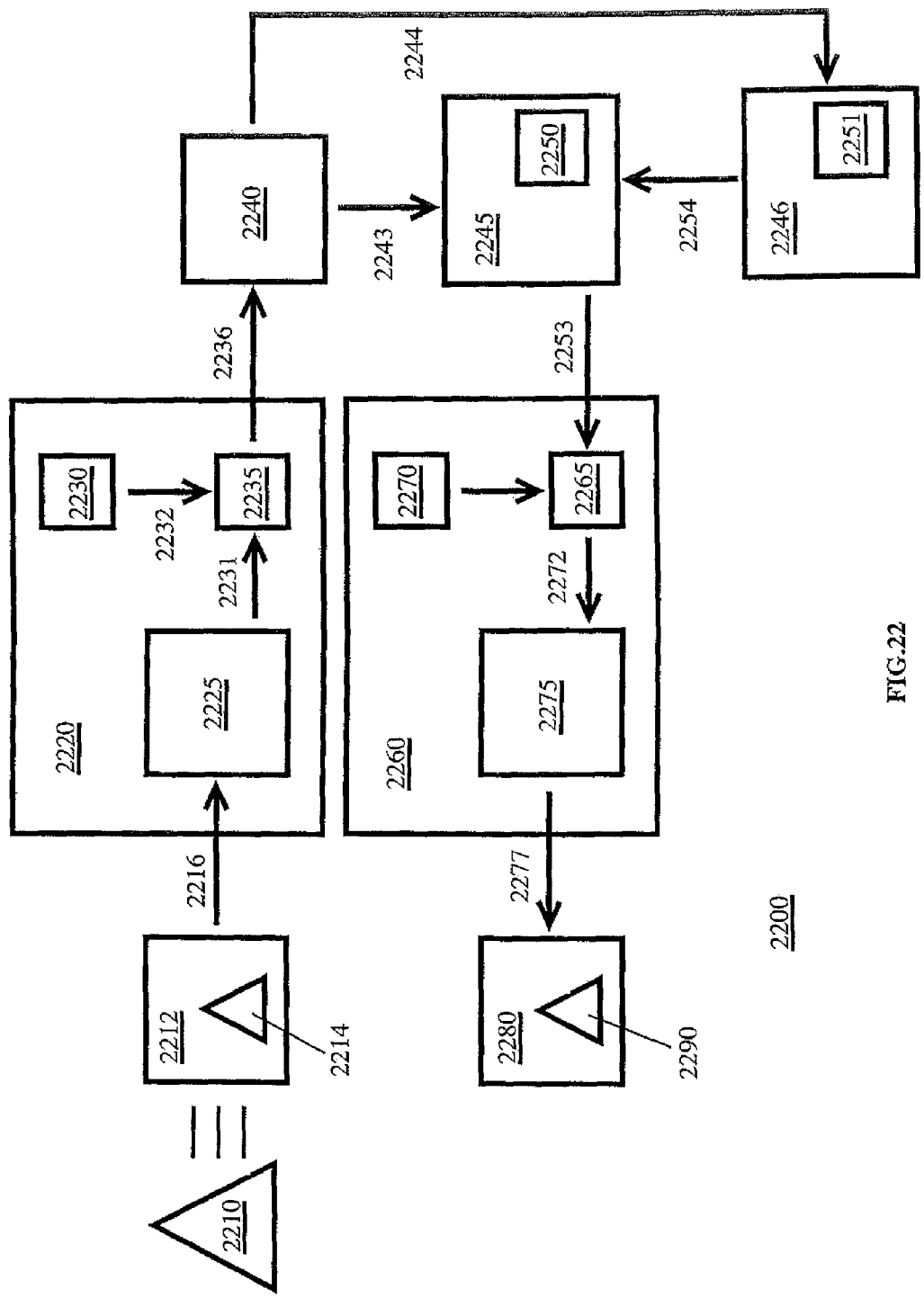
FIG. 22 shows a schematic diagram of a system of this invention to implement frame pre-processing and post-processing methods according to embodiments of this invention.

FIG. 22 depicts a schematic drawing 2200 of a computer-based system for implementing frame pre-processing, codec compression and decompression, and frame post-processing of this invention. An image of Object 2210 is captured as Frame 2214 by Camera 2212. Frame 2214 is transferred at step 2216 to First Device 2220, which contains Buffer 2225 to store Frame 2214, Memory Device 2230 containing instructions for pre-processing and Pre-Processing Module 2235. Frame 2214 is transferred to Pre-Processing Module 2235, and pre-processing steps 2232 of this invention are carried out in Pre-Processing Module 2235, thereby producing a pre-processed frame. The pre-processed frame is transferred to Codec Compression Module 2240, where the pre-processed frame is compressed. The compressed frame is transferred at step 2243 to Receiver 2245, containing Codec Decompression Module 2250, where the compressed frame is decompressed. The decompressed frame is transferred at step 2253 to Device 2260, which contains Memory Device 2270 containing instructions for post-processing. Device 2260 also contains Post-Processing Module 2265, where the decompressed frame is post-processed according to embodiments of this invention. The post-processed frame may be stored in buffer 2275 or transferred directly via step 2277 to Display Monitor 2280, where Post-Processed Image 2290 is displayed.

FIG. 22 also shows that optionally, the compressed frame is transferred at step 2244 to Receiver 2246, containing Storage Device 2251, where the compressed frame is kept for further use. When the frame is needed to be displayed, it is transferred at step 2254 to device 2245 where it is processed as described above.

It can be appreciated that similar systems can be constructed in which different codecs are incorporated, each of which receives a pre-processed frame according to methods of this invention, but which are compressed and decompressed using the particular codec. Then, after decompression, post-processing of this invention can be accomplished such that the monitor devices of different systems display images that are similar in quality to each other.

Example 10

Pre-Processing and Post-Processing Devices

Figure 23A:
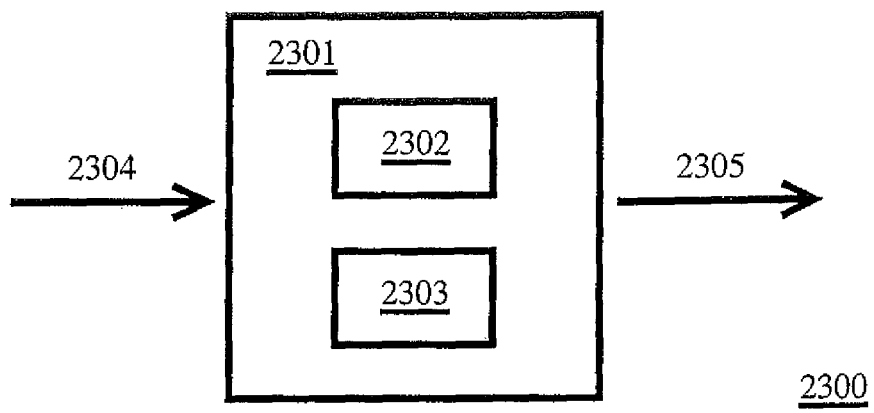
FIGS. 23A and 23B depict schematic drawings of pre-processing (FIG. 23A) and posts-processing (FIG. 23B) devices of this invention.

This invention includes integrated devices for pre-processing and post-processing of frames according to methods disclosed herein. FIG. 23A depicts a schematic diagram 2300 of Pre-Processing Device 2301 of this invention. Pre-Processing Device 2301 contains a Memory Area 2302 containing instructions for pre-processing, and Processor 2303 for carrying out instructions contained in Memory Area 2302. Such combined memory and pre-processing devices may be integrated circuits that can be manufactured separately and then incorporated into video systems. Connection of Pre-Processing Device 2301 into a video system is indicated at Input 2304, where a frame from an image capture device (e.g., camera) can be input into Pre-Processing Device 2301. Output of the Pre-Processing Device 2301 is shown at Output 2305, which can be connected to a codec (not shown). Optionally, a buffer area (not shown) may be included in Pre-Processing Device 2301.

Figure 23B:
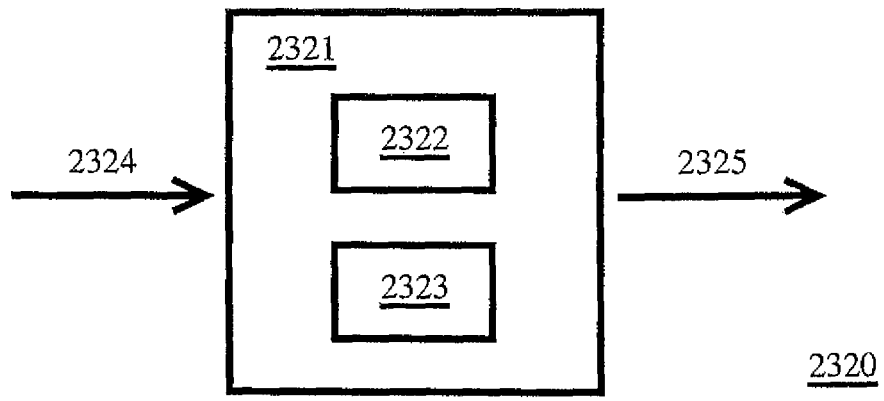

Similarly, FIG. 23B depicts a schematic diagram 2320 of Post-Processing Device 2321 of this invention. Post-Processing Device 2321 contains a Memory Area 2322 containing instructions for post-processing according to methods of this invention, and also includes Processor 2323 for carrying out instructions contained in Memory Area 2322. Such combined memory and post-processing devices may be integrated circuits that can be manufactured separately and then incorporated into video systems. Connection of Post-Processing Device 2321 to a video system is indicated at Input 2324, where a decompressed frame from a codec (not shown) can be input into Post-Processing Device 2321. Output of the Post-Processing Device 2321 is shown at Output 2325, which can be attached to an output device, such as a video monitor (not shown). Optionally, a buffer area (not shown) may be included in Post-Processing Device 2321.

Example 11

Figure 24A:
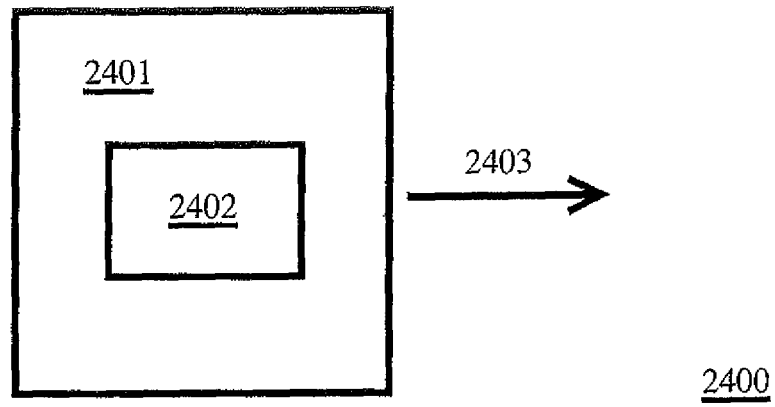
FIGS. 24A and 24B depict schematic drawings of computer readable devices containing instructions for pre-processing (FIG. 24A) and post-processing (FIG. 24B) of this invention.

Computer-Readable Devices Containing Instructions for Pre-Processing and Post-Processing FIG. 24A depicts a schematic drawing 2400 of an embodiment of a computer readable device 2401 of this invention. Device 2401 contains Memory Area 2402, which contains instructions for frame pre-processing according to methods of this invention. Such a device may be a diskette, flash memory, tape drive or other hardware component. Instructions contained on Device 2401 can be transferred at step 2403 to an external pre-processor (not shown) for execution of the instructions contained in Memory Area 2402.

Figure 24B:
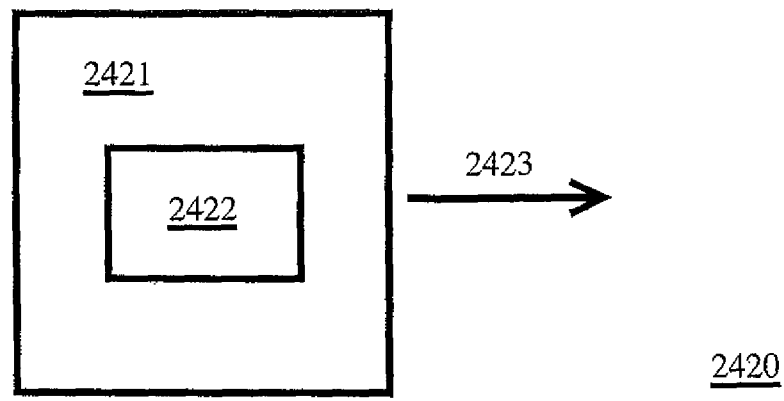

FIG. 24B depicts a schematic drawing 2420 of an embodiment of a computer readable device 2421 of this invention. Device 2421 contains Memory Area 2422, which contains instructions for frame post-processing according to methods of this invention. Such a device may be a diskette, flash memory, tape drive or other hardware component. Instructions contained on Device 2421 can be transferred at step 2423 to an external post-processor (not shown) for execution of the instructions contained in Memory Area 2422.

Example 12

Calculation of Inverse Wavelet Transform (IWT) Using Haar Wavelets

FIG. 25 is a graphical depiction of a method for calculating the inverse wavelet transform (IWT) using Haar wavelets. The top row of FIG. 25 represents the x elements of a series of pixels in sequence. The vertical dashed lines represent alignment of the y elements of a series of pixels and the x elements above, and with the z elements of a series of pixels below. Values of the low pass wavelet coefficients are indicated in the three pairs of cells immediately below the top row (x elements). Values of the high pass wavelet coefficients are indicated as the three pairs of cells immediately above the bottom row (z elements). Equations used to calculate the y values corresponding to the pixels are indicated between the cells depicting low pass and high pass wavelet coefficients.

Also shown in FIG. 25 are the equations used to calculate y values ($y_0$, $y_1$, etc.) from the corresponding x values ($x_0$, $x_1$, etc.) and the corresponding z values (z0, z1, etc.).

Example 13

Calculation of Wavelet Transform (WT) Using Haar Wavelets

FIG. 26 is a graphical depiction of a method for calculating wavelet transform (WT) low frequency (LF) and high frequency (HF) values process using Haar wavelets. A series of y elements is shown ($y_{2n}$, $y_{2n-1}$, $y_0$, etc.). Above the row of y elements are three pairs of cells, each indicating x values of corresponding pixels, along with equations used to calculate the x values shown to the right of each of the pairs of cells.

Also shown in FIG. 26 are three pairs of cells shown below the row of y values, each indicating z values of corresponding pixels, along with equations used to calculate the z values shown at the right of each of the pairs of cells.

Also shown in FIG. 26 are the equations used to calculate x values ($x_0$, $x_1$, etc.; on the left side), and the equations used to calculate z values ($z_0$, $z_1$, etc.; on the right side).

REFERENCES

The following references are each expressly incorporated fully by reference.
1. Ten Lectures on Wavelets by Ingrid Daubechies, Society for Industrial and Applied Mathematics, 1992.
2. U.S. Pat. No. 7,317,840 entitled: "Methods for Real-Time Software Video/Audio Compression, Transmission, Decompression, and Display," Angel DeCegama, Inventor.

INDUSTRIAL APPLICABILITY

Systems and methods of this invention can be used in the telecommunications and video industries to permit high-quality video to be stored, transmitted and replayed at reduced cost and with reduced requirements for computer storage capacity. The implications of aspects of this invention for the reduction of the current staggering costs of video storage and transmission are significant.

I claim:

1. A method for producing a video image of an object, comprising the steps:
    a. providing a digitized image frame of said object and storing said digitized image frame in a memory device of a computer processor;
    b. providing a decimated Haar wavelet transform (WT) of said digitized image frame;
    c. discarding high-frequency components of said decimated. WT thereby producing a pre-processed frame;
    d. compressing said pre-processed frame using a video codec thereby producing a compressed video frame;
    e. decompressing said compressed video frame using said codec; and
    f. recreating a full sized image of said frame using post-processing using low-frequency parts of the WT and the last pixel of every row and column of the original image before the WT.

2. The method of claim 1, where said step of pre-processing including a single level frame size reduction according to the following steps:
    (1) for every row in input frame pFrameIn:
        i. compute the decimated low-frequency Haar WT for consecutive pixels;
        ii. store in half the width of pFrameIn the resulting values;
        iii. at end of row, store the last pixel unchanged;
    (2) for every 2 consecutive rows in modified pFrameIn:
        i. compute the decimated low frequency Haar WT of corresponding pixels in the 2 rows column by column;
        ii. store the resulting values in output frame pFrameOut;
        iii. advance row position by 2; and
    (3) store the last row of the modified pFrameIn in pFrameOut last row.

3. The method of claim 2, further comprising a second level pre-processing.

4. The method of claim 2, further comprising a second level and a third level of pre-processing.

5. The method of claim 2, wherein said step of post-processing includes a first level frame size expansion according to the following steps:
    (a) copy last row of input frame (pFrameIn) into intermediate output frame (Img) with the same pixels per row as pFrameIn and double the number of rows;
    (b) for each pixel position of pFrameIn and Img:
        i. calculate the new pixel values of 2 rows of 1 mg starting at the bottom and moving up column by column according to the formulas:

$$y_{2n}=(2x_n+y_{2n+1})/3;$$

and $$y_{2n-1}=(4x_n-y_{2n+1})/3,$$

where the x's represent pixels of pFrameIn and the y's represent pixels of 1 Img;
        ii. store the calculated pixels in 1 mg
    (c) for every row of Img:
        i. start with the last pixel and store it in the last pixel of the corresponding row of the output frame (pFrameOut);
        ii. compute the pixels of the rest of the row from right to left according to the above formulas where now the x's represent the pixels of 1 mg and the y's represent the pixels of pFrameOut; and
        iii. store the calculated pixels in pFrameOut.

6. The method of claim 5, further comprising a second level frame size expansion.

7. The method of claim 5, further comprising a second level and a third level of frame size expansion.

8. A system for video image compression and decompression, comprising:
    a first computer module for image frame pre-processing using direct Haar wavelet transformation (WT);
    a video codec;
    a second computer module for image frame post-processing using low-frequency parts of the WT and the last pixel of every row and column of the original image before the WT; and
    an output device;
    said first computer module, or said second computer module is a programmable processing apparatus selected from the group consisting of mainframe computers, desktop computers, personal computers, laptop computers, tablet computers, wireless computers and cellular telephones.

9. The system of claim 8, wherein two filters that make up matrix T, when convolved with an image component selected from Y, U, V, R, G, or B, results in an image component which is 4 times larger than a non-expanded image.

10. A computer device for pre-processing a video image frame, comprising:
    an input;
    a computer storage module containing instructions for frame pre-processing of a video frame received by said input according to decimated Haar WT;
    a processor for processing said decimated WT by retaining low-frequency parts and discarding high-frequency parts; and an output; said instructions for pre-processing includes the following steps:
(a) for every row in input frame (pFrameIn):
   i. compute the decimated low-frequency Haar WT for consecutive pixels;
   ii. store in half the width of pFrameIn the resulting values;
   iii. at end of row, store the last pixel unchanged;
(b) for every 2 consecutive rows in modified pFrameIn:
   i. compute the decimated low frequency Haar WT of corresponding pixels in the 2 rows column by column;
   ii. store the resulting values in output frame (pFrameOut);
   iii. advance row position by 2; and
(c) store the last row of the modified pFrameIn in pFrameOut last row.

11. A computer device for post-processing a video image frame, comprising:
an input;
a computer storage module containing instructions for frame post-processing using low-frequency parts of a Haar WT and the last pixel of every row and column of the original image before the WT;
a processor for processing a video frame received by said input and said instructions to re-create a video image; and
an output; said instructions for post-processing includes the following steps:
(a) copy last row of input frame (pFrameIn) into intermediate output frame (1 mg) with the same pixels per row as pFrameIn and double the number of rows;
(b) for each pixel position of pFrameIn and Img:
   i. calculate the new pixel values of 2 rows of Img starting at the bottom and moving up column by column according to the formulas:

$$y_{2n}=(2x_n+y_{2n+1})/3;$$

and $$y_{2n-1}=(4x_n-y_{2n+1})/3,$$

where the x's represent pixels of pFrameIn and the y's represent pixels of Img;
   ii. store the calculated pixels in Img
(c) for every row of Img:
   i. start with the last pixel and store it in the last pixel of the corresponding row of the output frame (pFrameOut);
   ii. compute the pixels of the rest of the row from right to left according to the above formulas where now the x's represent the pixels of Img and the y's represent the pixels of pFrameOut; and
   iii. store the calculated pixels in pFrameOut.

12. A computer readable medium, comprising:
a physical medium; and
instructions thereon to pre-process a video frame using a Haar WT; said instructions for pre-processing includes a single level frame size reduction include the following steps:
(a) for every row in input frame (pFrameIn):
   i. compute the decimated low-frequency Haar WT for consecutive pixels;
   ii. store in half the width of pFrameIn the resulting values;
   iii. at end of row, store the last pixel unchanged;
(b) for every 2 consecutive rows in modified pFrameIn:
   i. compute the decimated low frequency Haar WT of corresponding pixels in the 2 rows column by column;
   ii. store the resulting values in output frame (pFrameOut);
   iii. advance row position by 2; and
(c) store the last row of the modified pFrameIn in pFrameOut last row.

13. A computer readable medium, comprising:
a physical medium; and
instructions thereon to post-process a reduced video frame using low-frequency parts of a Haar WT and the last pixel of every row and column of the original image before the WT; said instructions for post-processing includes a first level frame size expansion according to the following steps:
(a) copy last row of input frame (pFrameIn) into intermediate output frame (Img) with the same pixels per row as pFrameIn and double the number of rows;
(b) for each pixel position of pFrameIn and Img:
   i. calculate the new pixel values of 2 rows of Img starting at the bottom and moving up column by column according to the formulas:

$$y_{2n}=(2x_n+y_{2n+1})/3;$$

and $$y_{2n-1}=(4x_n-y_{2n+1})/3,$$

where the x's represent pixels of pFrameIn and the y's represent pixels of Img;
   ii. store the calculated pixels in Img
(c) for every row of Img:
   i. start with the last pixel and store it in the last pixel of the corresponding row of the output frame (pFrameOut);
   ii. compute the pixels of the rest of the row from right to left according to the above formulas where now the x's represent the pixels of Img and the y's represent the pixels of pFrameOut; and
   iii. store the calculated pixels in pFrameOut.

* * * * *